US012585232B2

(12) United States Patent (10) Patent No.: US 12,585,232 B2

Shah et al. (45) Date of Patent: Mar. 24, 2026

(54) SUBSTRATE SUPPORT CHARACTERIZATION TO BUILD A DIGITAL TWIN

(71) Applicant: Applied Materials, Inc., Santa Clara, CA (US)

(72) Inventors: Vivek Bharat Shah, Santa Clara, CA (US); Chunlei Zhang, Santa Clara, CA (US); Anders Andelman Nottrott, Alameda, CA (US)

(73) Assignee: Applied Materials, Inc., Santa Clara, CA (US)

( * ) Notice: Subject to any disclaimer, the term of this patent is extended or adjusted under 35 U.S.C. 154(b) by 386 days.

(21) Appl. No.: 17/558,509

(22) Filed: Dec. 21, 2021

(65) Prior Publication Data

US 2023/0195060 A1 Jun. 22, 2023

(51) Int. Cl.
*G05B 13/04* (2006.01)
*G05B 19/18* (2006.01)

(52) U.S. Cl.
CPC ......... *G05B 13/048* (2013.01); *G05B 19/188* (2013.01); *G05B 2219/45031* (2013.01)

(58) Field of Classification Search
CPC ................ G05B 13/048; G05B 19/188; G05B 2219/45031; H01L 21/67103; H01L 21/6831
See application file for complete search history.

(56) References Cited

U.S. PATENT DOCUMENTS

| | | | |
|---|---|---|---|
| 6,700,370 B2 | 3/2004 | Chen et al. | |
| 7,196,782 B2 | 3/2007 | Fielden et al. | |
| 7,567,700 B2 | 7/2009 | Funk et al. | |
| 2002/0053904 A1* | 5/2002 | Chen ..................... | G01B 7/085 |
| | | | 324/230 |
| 2003/0033116 A1* | 2/2003 | Brcka ................ | H01L 21/6831 |
| | | | 702/182 |
| 2007/0091541 A1* | 4/2007 | Buchberger ...... | H01J 37/32724 |
| | | | 361/234 |
| 2010/0193501 A1* | 8/2010 | Zucker .............. | H01L 21/67248 |
| | | | 219/443.1 |

(Continued)

FOREIGN PATENT DOCUMENTS

| | | |
|---|---|---|
| KR | 20210005748 A | 1/2021 |
| WO | 2007064435 A2 | 6/2007 |

(Continued)

OTHER PUBLICATIONS

International Search Report and Written Opinion for International Application No. PCT/US2022/052739, mailed May 12, 2023, 8 Pages.

*Primary Examiner* — Kamini S Shah
*Assistant Examiner* — Mohammed Shafayet
(74) *Attorney, Agent, or Firm* — Lowenstein Sandler LLP

(57) ABSTRACT

A method includes receiving data indicative of properties of a substrate support from one or more sensors of a removable sensor assembly disposed proximate to the substrate support. The method further includes providing data based on the data indicative of properties of a substrate support to a physics-based model of the substrate support. The method further includes receiving predicted performance data of the substrate support from the physics-based model.

14 Claims, 8 Drawing Sheets

(56) References Cited

U.S. PATENT DOCUMENTS

| | | | |
|---|---|---|---|
| 2012/0307412 A1* | 12/2012 | Boyd, Jr. ............ | H01L 21/6875 |
| | | | 29/402.18 |
| 2017/0286572 A1 | 10/2017 | Hershey et al. | |
| 2018/0082826 A1* | 3/2018 | Guha ................ | H01J 37/32082 |
| 2019/0318444 A1* | 10/2019 | Juarez ..................... | G01J 5/047 |
| 2022/0114307 A1* | 4/2022 | Severson ................ | G06F 30/23 |
| 2022/0382227 A1* | 12/2022 | Plochowietz ........ | G05B 13/048 |

FOREIGN PATENT DOCUMENTS

| | | | |
|---|---|---|---|
| WO | 2015200719 A1 | 12/2015 | |
| WO | 2021154747 A1 | 8/2021 | |

* cited by examiner

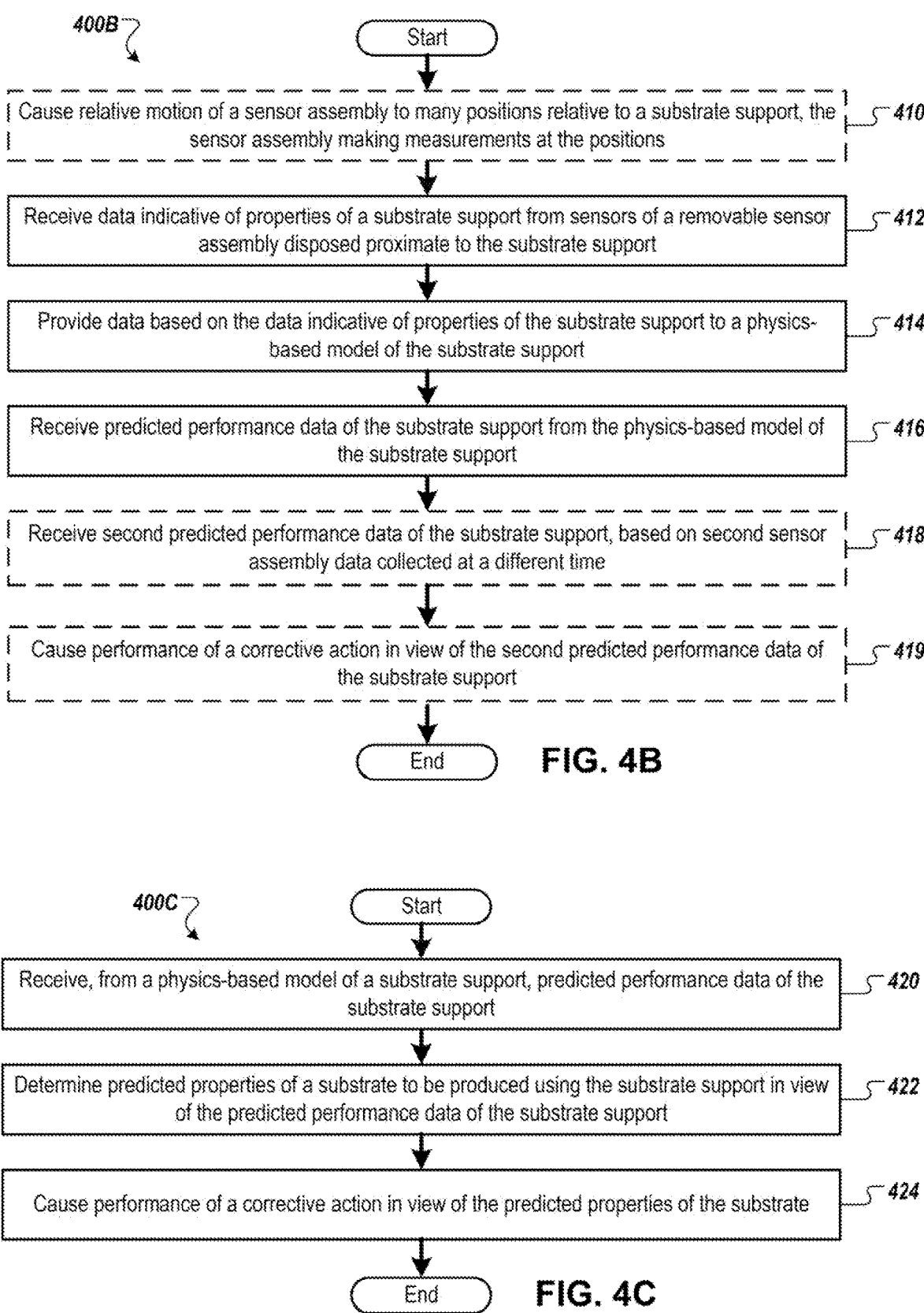

*400B*

Start

Cause relative motion of a sensor assembly to many positions relative to a substrate support, the sensor assembly making measurements at the positions    410

Receive data indicative of properties of a substrate support from sensors of a removable sensor assembly disposed proximate to the substrate support    412

Provide data based on the data indicative of properties of the substrate support to a physics-based model of the substrate support    414

Receive predicted performance data of the substrate support from the physics-based model of the substrate support    416

Receive second predicted performance data of the substrate support, based on second sensor assembly data collected at a different time    418

Cause performance of a corrective action in view of the second predicted performance data of the substrate support    419

End    FIG. 4B

*400C*

Start

Receive, from a physics-based model of a substrate support, predicted performance data of the substrate support    420

Determine predicted properties of a substrate to be produced using the substrate support in view of the predicted performance data of the substrate support    422

Cause performance of a corrective action in view of the predicted properties of the substrate    424

End    FIG. 4C

SUBSTRATE SUPPORT CHARACTERIZATION TO BUILD A DIGITAL TWIN

TECHNICAL FIELD

The instant specification relates to characterization of a substrate support for substrate processing. More specifically, the instant specification relates to characterization of a substrate support to build a physics-based digital twin model of the substrate support.

BACKGROUND

Chambers are used in many types of processing systems. Examples of chambers include etch chambers, deposition chambers, anneal chambers, and the like. Typically, a substrate, such as a semiconductor wafer, is placed on a substrate support within the chamber and conditions in the chamber are set and maintained to process the substrate. The properties of the substrate support have an effect on the properties of the completed substrate.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one aspect of the disclosure, a method includes receiving data indicative of properties of a substrate support from one or more sensors of a removable sensor assembly disposed proximate to the substrate support. The method further includes providing data based on the data indicative of properties of a substrate support to a physics-based model of the substrate support. The method further includes receiving predicted performance data of the substrate support from the physics-based model.

In another aspect of the disclosure, a method includes receiving predicted performance data of a substrate support from a physics-based model of the substrate support. The method further includes determining predicted properties of a substrate to be processed using the substrate support, in view of the predicted performance data of the substrate support. The method further includes causing a corrective action to be performed in view of the predicted properties of a substrate.

In another aspect of the disclosure, a sensor assembly system is disclosed. The sensor assembly system includes a stand configured for placement proximate to a substrate support. The sensor assembly system further includes a moveable support coupled to the stand, wherein the movable support is movable on at least two axes. The sensor assembly further includes a number of sensors disposed on the moveable support. The movable support of the sensor assembly system is configured to move the sensors to a set of positions relative to the substrate support. The sensors are to generate one or more measurements at each of the positions relative to the substrate support.

BRIEF DESCRIPTION OF THE DRAWINGS

The present disclosure is illustrated by way of example, and not by way of limitation in the figures of the accompanying drawings.

FIGS. 4A-E are flow diagrams of methods associated with characterizing a substrate support to cause a corrective action, according to some embodiments.

DETAILED DESCRIPTION

Figure 1:
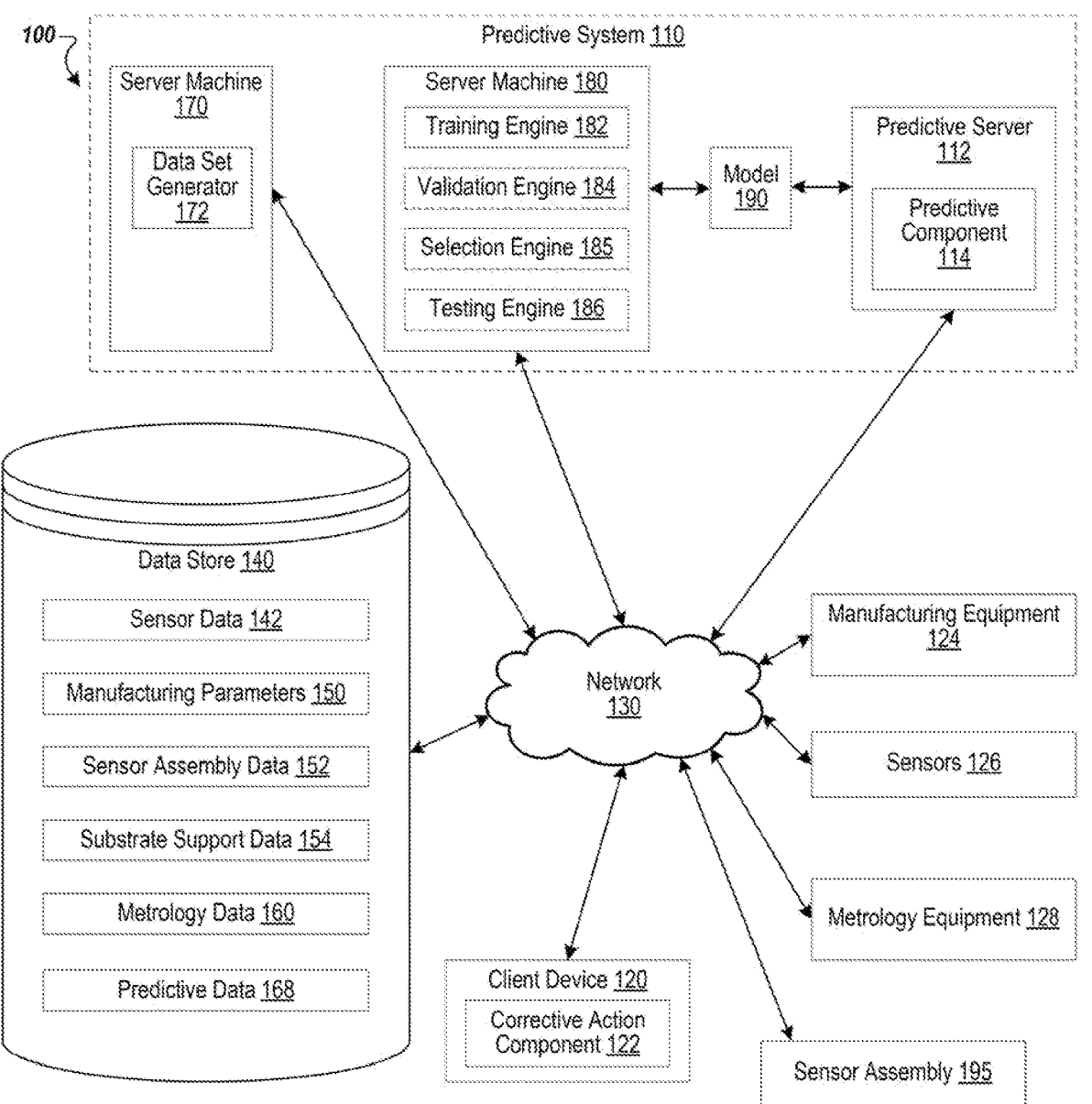
FIG. 1 is a block diagram illustrating an exemplary system (exemplary system architecture), according to some embodiments.

Described herein are technologies directed to characterization of properties of a substrate support (e.g., a chuck assembly associated with substrate manufacturing equipment) using a sensor assembly system to build a physics-based digital twin model. Manufacturing equipment is used to produce substrates, such as semiconductor wafers. The properties of these substrates are determined by the conditions in which the substrates were processed. Accurate knowledge of property values in the manufacturing chamber during operation, especially in the immediate vicinity of the substrate, can be used to predict the properties of finished products, consistently produce substrates with the same properties, and tailor processing parameters to optimize substrate production.

In some cases, a wafer is placed upon a substrate support for processing. The substrate support may include some processing architecture, e.g., an electrostatic chucking mechanism, a heater, etc. A substrate support assembly is typically manufactured to within a tolerance level. In some cases, a manufacturing process using a particular substrate support will produce consistent, high-quality substrates. In some cases, possibly even when the substrate support is within manufacturing tolerance, a manufacturing process using a particular substrate support may not produce high-quality substrates. Often, determination of the quality of substrates produced using a particular substrate support (and, as an extension, selection of a suitable substrate support) is performed empirically. Such an approach involves experimentation, which can be costly in terms of time expended, materials used, energy and gasses expended, etc. Additionally, as manufacturing chambers are used repeatedly, their properties tend to drift, due to material buildup, aging parts, temperature and gas cycling, alterations during cleaning procedures, and the like. The properties of the substrate support may drift. Any acquired knowledge mapping input processing parameters to output substrate properties degrades as chamber and substrate support properties drift. A further problem with this conventional approach is that a substrate support system has a finite lifetime. Eventually, the substrate support component will be replaced, and the process of producing wafers, performing metrology on the wafers, and selecting a substrate support based on the metrology will be repeated. Any attempt to produce a new type of wafer, with processing parameters outside the range of those understood by the conventional methods, further compounds the problem.

In one or more embodiments, the methods and devices of the current disclosure address at least these deficiencies of the conventional approach. This disclosure enables the use of a sensor assembly to characterize properties of a substrate support. Property values associated with the support, measured by the sensors of the sensor assembly, are then provided to inform a physics-based digital twin model of the substrate support. In this way, characterization of the substrate support may be performed directly, avoiding incurring the costs associated with substrate production, characterization, and disposal. In some embodiments, the methods of the present disclosure include the use of a removable sensor assembly. The sensor assembly includes a support device for sensors and a means of securing the assembly proximate to a substrate support. In some embodiments, the substrate support may be disposed in a manufacturing chamber. In some embodiments, measurements of substrate support properties may be performed outside a manufacturing chamber (e.g., before the substrate support is installed in a manufacturing chamber). Data collected by the sensor assembly is correlated with performance of the substrate support. For instance, the substrate support may include, below the surface of the support, electrodes. Electrodes may include chucking electrodes (e.g., in an electrostatic chuck), heater electrodes, RF electrodes, etc. Sensors of the sensor assembly may measure properties of the substrate support indicative of performance of these electrodes, such as measuring the distance below the surface of the substrate support the electrodes are located, measuring properties related to the interaction between the substrate support and a substrate (e.g., surface profiling to characterize heat transfer to a wafer), etc.

In some embodiments, methods and devices of the current disclosure further include providing data, generated in view of the measurement data from the sensor assembly (e.g., processed measurement data), to a physics-based digital twin model. The physics-based digital twin model is configured to provide solutions to equations related to performance of the substrate support (e.g., heat transfer equations). The various parameters involved in the physics-based digital twin model may be calculated based on measurements provided by the sensor assembly. In some embodiments, methods of the current disclosure further include receiving predicted performance data associated with the substrate support from the physics-based model.

In some embodiments, the methods of the present disclosure further include using the predicted performance data of the substrate support (output by the physics-based model) to generate predicted properties of a substrate to be produced using the substrate support. Substrate properties correlate strongly with conditions proximate to the substrate. The performance of the substrate support has an impact upon those conditions. For instance, uneven temperature profile at the surface of the substrate support may be caused by uneven depth of at least one heating electrode below the surface of the substrate support. Uneven temperature profile at the surface of the substrate support may cause uneven processing of a substrate, e.g., uneven deposition, etching, etc. The method may further include causing a corrective action to be performed in view of the predicted substrate properties (e.g., an update to a process recipe to produce a substrate with different properties than those predicted).

This disclosure further enables, in some embodiments, a removable sensor assembly system. The sensor assembly system may be used to measure properties of a substrate support. In some embodiments, the sensor assembly system may be used inside a manufacturing chamber (e.g., to measure properties of a substrate support installed in a manufacturing chamber). In some embodiments, the sensor assembly system may be used outside a manufacturing chamber. The sensor assembly may include a stand, configured to secure the sensors of the sensor assembly proximate to a substrate support. The sensor assembly system may further include a moveable support coupled to the stand. The movable support may be movable on two or more axes. The movable support causes relative motion between the sensor assembly and the substrate support. The measurement region of the sensors may be smaller than the surface of the substrate support, and use of the movable support may enable a scan of the entire surface of the support to be performed. In some embodiments, the substrate support may be coupled to the movable support and the sensory assembly may remain stationary.

Aspects of the present disclosure result in technological advantages over conventional methods. Characterization of the substrate support can be accomplished by performing measurements and supplying data indicative of those measurements to a physics-based digital twin model. This characterization avoids the expensive conventional method of testing a substrate support by manufacturing wafers using the substrate support, performing metrology on the wafers, and inferring quality of the substrate support from the metrology. Aspects of the present disclosure also allow for an improved selection process of a substrate support to use for a manufacturing process if several substrate supports are available. Some substrate supports may provide a mechanism for spatially localized control of some properties (e.g., multiple heating electrodes located at different areas beneath the surface of the substrate support). Characterizing the substrate support can enable tuning of the control of a substrate to generate more favorable conditions for substrate manufacturing (e.g., supplying different voltages to each heater electrode to generate a target temperature profile at the surface of the substrate support). Additionally, the substrate support can be re-characterized (e.g., during a planned maintenance event) to account for any drift in the component, or if a problem with the manufacturing chamber is suspected, the substrate support can be re-characterized and either confirmed or ruled out as the component responsible.

FIG. 1 is a block diagram illustrating an exemplary system 100 (exemplary system architecture), according to some embodiments. The system 100 includes a client device 120, manufacturing equipment 124, sensors 126, metrology equipment 128, a predictive server 112, data store 140, and sensor assembly 195. The predictive server 112 may be part of predictive system 110. Predictive system 110 may further include server machines 170 and 180.

In some embodiments, manufacturing equipment 124 (e.g., cluster tool) is part of a substrate processing system (e.g., integrated processing system). The manufacturing equipment 124 includes one or more of a controller, an enclosure system (e.g., substrate carrier, front opening unified pod (FOUP), autoteach FOUP, process kit enclosure system, substrate enclosure system, cassette, etc.), a side storage pod (SSP), an aligner device (e.g., aligner chamber), a factory interface (e.g., equipment front end module (EFEM)), a load lock, a transfer chamber, one or more processing chambers, a robot arm (e.g., disposed in the transfer chamber, disposed in the front interface, etc.), and/or the like. The enclosure system, SSP, and load lock mount to the factory interface and a robot arm disposed in the factory interface is to transfer content (e.g., substrates, process kit rings, carriers, validation wafer, etc.) between the enclosure system, SSP, load lock, and factory interface. The aligner device is disposed in the factory interface to align the content. The load lock and the processing chambers mount to the transfer chamber and a robot arm disposed in the transfer chamber is to transfer content (e.g., substrates, process kit rings, carriers, validation wafer, etc.) between the load lock, the processing chambers, and the transfer chamber. In some embodiments, manufacturing equipment 124 includes components of substrate processing systems. In some embodiments, manufacturing equipment 124 is used to produce one or more products (e.g., substrates, semiconductors, wafers, etc.). In some embodiments, manufacturing equipment 124 is used to produce one or more components to be used in substrate processing systems. In some embodiments, manufacturing equipment 124 is used to produce and/or includes a bonded metal plate structure (e.g., showerhead to be used in a processing chamber of a substrate processing system).

Sensors 126 may provide sensor data 142 associated with manufacturing equipment 124 (e.g., associated with producing, by manufacturing equipment 124, corresponding products, such as wafers). Sensor data 142 may be used for equipment health and/or product health (e.g., product quality), for example. Manufacturing equipment 124 may produce products following a recipe or performing runs over a period of time. In some embodiments, sensor data 142 may include values of one or more of temperature (e.g., heater temperature), spacing (SP), pressure, High Frequency Radio Frequency (HFRF), voltage of Electrostatic Chuck (ESC), electrical current, flow (e.g., of one or more gases), power, voltage, etc. Sensor data 142 may include historical sensor data and current sensor data. Manufacturing equipment 124 may be configured according to manufacturing parameters 150. Manufacturing parameters 150 may be associated with or indicative of parameters such as hardware parameters (e.g., settings or components (e.g., size, type, etc.) of the manufacturing equipment 124) and/or process parameters of the manufacturing equipment. Manufacturing parameters 150 may include historical manufacturing data and/or current manufacturing data. Manufacturing parameters 150 may be indicative of input settings to the manufacturing device (e.g., heater power, gas flow, etc.). Sensor data 142 and/or manufacturing parameters 150 may be provided while the manufacturing equipment 124 is performing manufacturing processes (e.g., equipment readings when processing products). Sensor data 142 may be different for each product (e.g., each wafer).

In some embodiments, sensor data 142, metrology data 160, and/or manufacturing parameters 150 may be processed (e.g., by the client device 120 and/or by the predictive server 112). Processing of sensor data 142 may include generating features. In some embodiments, the features are a pattern in the sensor data 142, metrology data 160, and/or manufacturing parameters 150 (e.g., slope, width, height, peak, etc.) or a combination of values from the sensor data 142, metrology data 160, and/or manufacturing parameters 150 (e.g., power derived from voltage and current, etc.). Sensor data 142 may include features and the features may be used by predictive component 114 for performing signal processing and/or for obtaining predictive data 168, possibly for performance of a corrective action. Predictive data 168 may be any data associated with predictive system 110, e.g. predicted performance data of a substrate support.

Each instance (e.g., set) of sensor data 142 may correspond to a product (e.g., a wafer), a set of manufacturing equipment, a type of substrate produced by manufacturing equipment, a combination thereof, or the like. Each instance of metrology data 160 and manufacturing parameters 150 may likewise correspond to a product, a set of manufacturing equipment, a type of substrate produced by manufacturing equipment, a combination thereof, or the like. The data store may further store information associating sets of different data types, e.g. information indicative that a set of sensor data, a set of metrology data, and/or a set of manufacturing data are all associated with the same product, manufacturing equipment, type of substrate, etc.

In some embodiments, predictive system 110 may generate predictive data 168 using machine learning (e.g., target output comprising data indicative of a manufacturing fault provided in predictive system 110, etc.), as discussed in greater detail below.

The client device 120, manufacturing equipment 124, sensors 126, metrology equipment 128, predictive server 112, data store 140, server machine 170, server machine 180, and sensor assembly 195 may be coupled to each other via a network 130 for generating sensor assembly data 152, substrate support data 154, and/or predictive data 168. These data may be used in performing corrective actions.

In some embodiments, network 130 is a public network that provides client device 120 with access to predictive server 112, data store 140, and/or other publically available computing devices. In some embodiments, network 130 is a private network that provides client device 120 access to manufacturing equipment 124, sensors 126, metrology equipment 128, data store 140, sensor assembly 195, and/or other privately available computing devices. Network 130 may include one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The client device 120 may include a computing device such as Personal Computers (PCs), laptops, mobile phones, smart phones, tablet computers, netbook computers, network connected televisions ("smart TV"), network-connected media players (e.g., Blu-ray player), a set-top-box, Over-the-Top (OTT) streaming devices, operator boxes, etc. The client device 120 may include a corrective action component 122. Corrective action component 122 may receive user input (e.g., via a Graphical User Interface (GUI) displayed via the client device 120) of an indication associated with manufacturing equipment 124. In some embodiments, the corrective action component 122 transmits the indication to the predictive system 110, receives output (e.g., predictive data 168) from predictive system 110, determines a corrective action based on the output, and causes the corrective action to be implemented.

In some embodiments, predictive system 110 may further include a predictive component 114. Predictive component 114 may take data retrieved from model 190 to generate predictive data 168. In some embodiments, predictive component 114 provides predictive data 168 to client device 120, and client device 120 causes a corrective action via corrective action component 122 in view of predictive data 168. In some embodiments, corrective action component 122 obtains sensor assembly data 152 associated with a substrate support of manufacturing equipment 124 (e.g., from data store 140, etc.) and provides the sensor assembly data 152 associated with a substrate support of manufacturing equipment 124 to predictive system 110.

In some embodiments, corrective action component 122 stores sensor assembly data 152 in data store 140 and predictive server 112 retrieves sensor assembly data 152 from data store 140. In some embodiments, predictive server 112 may store output (e.g., predictive data 168, substrate support data 154) of the trained model(s) 190 in data store 140 and client device 120 may retrieve the output from data store 140. In some embodiments, corrective action component 122 receives an indication of a corrective action from predictive system 110 and causes the corrective action to be implemented. Each client device 120 may include an operating system that allows users to one or more of generate, view, or edit data (e.g., indication associated with manufacturing equipment 124, corrective actions associated with manufacturing equipment 124, etc.).

Sensor assembly data 152 includes data collected by sensor assembly 195. Sensor assembly 195 is configured to collect data describing properties of a substrate support (e.g., an electrostatic chuck, a vacuum chuck, etc.). Sensor assembly data 152 may be provided to a physics-based digital twin model (e.g., model 190), which may output predictive performance data (e.g., substrate support data 154) of the substrate support. Substrate support data 154 may be taken as input by predictive system 110 to generate as output predicted property data (e.g., predictive data 168) of a substrate to be produced using the substrate support. Predictive system 110 may input substrate support data 154 into a model (e.g., model 190), which may include a trained machine learning model, to generate output predicted property data of a substrate. Predicted property data and metrology data 160 of a corresponding substrate may be compared by predictive system 110 to output a prediction of a manufacturing fault, chamber component drift, etc., and/or a corrective action. Predictive system 110 may input predicted property data and metrology data 160 into a model (e.g., model 190) to generate data indicative of a corrective action. This model may be a trained machine learning model in some embodiments. In some embodiments, the corrective action may be an update to manufacturing parameters 150 for future substrates to be produced by manufacturing equipment 124.

In some embodiments, metrology data 160 corresponds to historical property data of products (e.g., produced using manufacturing parameters associated with historical sensor data and historical manufacturing parameters) and predictive data 168 is associated with predicted property data (e.g., of products to be produced or that have been produced in conditions recorded by current sensor data and/or current manufacturing parameters). In some embodiments, the predictive data 168 is predicted metrology data (e.g., virtual metrology data) of the products to be produced or that have been produced according to conditions recorded as current sensor data and/or current manufacturing parameters. In some embodiments, predictive data 168 is or includes an indication of abnormalities (e.g., abnormal products, abnormal components, abnormal manufacturing equipment, abnormal energy usage, etc.) and/or one or more causes of the abnormalities. In some embodiments, predictive data 168 includes an indication of change over time or drift in some component of manufacturing equipment 124, sensors 126, metrology equipment 128, and the like. In some embodiments, predictive data 168 includes an indication of an end of life of a component of manufacturing equipment 124, sensors 126, metrology equipment 128, or the like.

Performing manufacturing processes that result in defective products can be costly in time, energy, products, components, manufacturing equipment 124, the cost of identifying the defects and discarding the defective product, etc. By inputting sensor assembly data 152 (e.g., measurements of properties of a substrate support) into a physics-based digital twin model (e.g., model 190), receiving output of substrate support data 154, and performing a corrective action based on substrate support data 154, system 100 can have the technical advantage of avoiding the cost of producing, identifying, and discarding defective products.

Performing manufacturing processes that result in failure of the components of the manufacturing equipment 124 can be costly in downtime, damage to products, damage to equipment, express ordering replacement components, etc. By inputting sensor assembly data 152 (e.g., measurements of properties of a substrate support) to a physics-based digital twin model (e.g., model 190), receiving output of substrate support data 154, comparing substrate support data sets from the same substrate support over time to diagnose drifting or failing components (recorded as predictive data 168), and performing corrective actions (e.g., predicted operational maintenance, such as replacement, processing, cleaning, etc. of components) based on the predictive data 168, system 100 can have the technical advantage of avoiding the cost of one or more of unexpected component failure, unscheduled downtime, productivity loss, unexpected equipment failure, product scrap, or the like. Monitoring the performance over time of components, e.g. manufacturing equipment 124, sensors 126, metrology equipment 128, and the like, may provide indications of degrading components. Monitoring the performance of a substrate support over time may extend the substrate support's operational lifetime, for instance if, after a standard replacement interval passes, measurements indicative that the substrate support may still perform well (e.g., performance above a threshold) for a time (e.g., until the next planned maintenance event).

Manufacturing parameters may be suboptimal for producing products which may have costly results of increased resource (e.g., energy, coolant, gases, etc.) consumption, increased amount of time to produce the products, increased component failure, increased amounts of defective products, etc. By inputting the sensor assembly data 152 into a trained physics-based model (e.g., model 190), receiving an output of substrate support data 154, and performing (e.g., based on substrate support data 154) a corrective action of updating manufacturing parameters (e.g., setting optimal manufacturing parameters), system 100 can have the technical advantage of using optimal manufacturing parameters (e.g., hardware parameters, process parameters, optimal design) to avoid costly results of suboptimal manufacturing parameters.

Corrective action may be associated with one or more of Computational Process Control (CPC), Statistical Process Control (SPC) (e.g., SPC on electronic components to determine process in control, SPC to predict useful lifespan of components, SPC to compare to a graph of 3-sigma, etc.), Advanced Process Control (APC), model-based process control, preventative operative maintenance, design optimization, updating of manufacturing parameters, updating manufacturing recipes, feedback control, machine learning modification, or the like.

In some embodiments, the corrective action includes providing an alert (e.g., an alarm to stop or not perform the manufacturing process if predictive data 168 indicates a predicted abnormality, such as an abnormality of the product, a component, or manufacturing equipment 124). In some embodiments, the corrective action includes providing feedback control (e.g., modifying a manufacturing parameter responsive to the predictive data 168 indicating an abnormality). In some embodiments, the corrective action includes providing machine learning (e.g., modifying one or more manufacturing parameters based on the predictive data 168). In some embodiments, performance of the corrective action includes causing updates to one or more manufacturing parameters. In some embodiments, performance of the corrective action includes causing updates to one or more calibration tables and/or equipment constants (e.g., a set point provided to a component may be adjusted by a value across a number of process recipes, for example voltage applied to a heater may be increased by 3% for all processes using the heater).

Manufacturing parameters may include hardware parameters (e.g., replacing components, using certain components, replacing a processing chip, updating firmware, etc.) and/or process parameters (e.g., temperature, pressure, flow, rate, electrical current, voltage, gas flow, lift speed, etc.). In some embodiments, the corrective action includes causing preventative operative maintenance (e.g., replace, process, clean, etc. components of the manufacturing equipment 124). In some embodiments, the corrective action includes causing design optimization (e.g., updating manufacturing parameters, manufacturing processes, manufacturing equipment 124, etc. for an optimized product). In some embodiments, the corrective action includes a updating a recipe (e.g., manufacturing equipment 124 to be in an idle mode, a sleep mode, a warm-up mode, etc.).

Predictive server 112, server machine 170, and server machine 180 may each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

Predictive server 112 may include predictive component 114. Predictive component 114 may be used to produce predictive data 168. In some embodiments, predictive component 114 may receive sensor assembly data 152, and/or manufacturing parameters 150 (e.g., receive from the client device 120, retrieve from the data store 140) and generate output for performing corrective action associated with manufacturing equipment 124 based on the current data. In some embodiments, predictive component 114 may use one or more models 190 to determine the output for performing the corrective action based on current data. Model 190 may be a single model, an ensemble model, or a collection of models used to process data. Model 190 may include one or more physics-based digital twin models, supervised machine learning models, unsupervised machine learning models, semi-supervised machine learning models, statistical models, etc.

In some embodiments, data indicative of properties of a substrate to be produced using a substrate support (e.g., predictive data 168 informed by substrate support data 154) is provided to a trained machine learning model (e.g., model 190). The machine learning model is trained to output data indicative of a corrective action to produce a substrate with different characteristics. In some embodiments, data indicative of predictive properties of a substrate produced using a substrate support, and metrology data of a substrate produced with that substrate support are provided as input to a trained machine learning model (e.g., model 190). The trained machine learning model predicts underlying causes for differences between predicted and measured data (e.g., manufacturing fault, component aging or drift, etc.).

Historical sensor data and/or historical sensor assembly data may be used in combination with current sensor data and current sensor assembly data to detect drift, changes, aging, etc. of components of manufacturing equipment 124. Sensor assembly data 152 monitored over time may generate information indicative of changes to a substrate support. Sensor assembly data 152 may also provide information related to other components of manufacturing equipment 124, e.g., uneven wear on the surface of a substrate support may indicate a problem with robotic handlers placing substrates on the substrate support. Predictive component 114 may use combinations and comparisons of these data types to generate predictive data 168. In some embodiments, predictive data 168 includes data predicting the lifetime of components of manufacturing equipment 124, sensors 126, etc.

Commonly, conventional systems perform little to no characterization of a substrate support. Classification of a substrate support as satisfactory or unsatisfactory may be performed responsive to making measurements of produced substrates and determining the products are satisfactory or unsatisfactory. Characterizing support-to-support variations (e.g., different responses to supplied voltage) may also be performed empirically, based on measurements taken from produced substrates. Characterization of substrate supports may allow the process of substrate support selection and tuning the use of substrate supports (e.g., optimal voltage to apply to various electrodes) without the waste associated with producing and measuring substrates.

In some embodiments, predictive component 114 receives data, such as sensor assembly data 152, metrology data 160, substrate support data 154, etc., and may perform pre-processing such as extracting patterns in the data or combining data to new composite data. Predictive component 114 may then provide the data to model 190 as input. Model 190 may include a physics-based digital twin model, accepting as input sensor assembly data. It may include a trained machine learning model, a statistical model, etc., configured to further process data associated with properties of a substrate support. Predictive component 114 may receive from model 190 predictive data, indicative of substrate support performance, predicted substrate properties, a manufacturing fault, component drift, or the like. Predictive component 114 may then cause a corrective action to occur. The corrective action may include sending an alert to client device 120. The corrective action may also include updating manufacturing parameters of manufacturing equipment 124. The corrective action may also include generating predictive data 168, indicative of chamber or instrument drift, aging, or failure.

Data store 140 may be a memory (e.g., random access memory), a drive (e.g., a hard drive, a flash drive), a database system, or another type of component or device capable of storing data. Data store 140 may include multiple storage components (e.g., multiple drives or multiple databases) that may span multiple computing devices (e.g., multiple server computers). The data store 140 may store sensor data 142, manufacturing parameters 150, sensor assembly data 152, substrate support data 154, metrology data 160, and predictive data 168. Sensor data may include sensor data time traces over the duration of manufacturing processes, associations of data with physical sensors, preprocessed data, such as averages and composite data, and data indicative of sensor performance over time (i.e., many manufacturing processes). Manufacturing parameters 150 and metrology data 160 may contain similar features. Sensor assembly data 152 includes measurements taken by sensor assembly 195, used to characterize a substrate support. Sensor assembly data 152 may include data from many types of sensors, associated with many properties, e.g., capacitive sensors (e.g., to determine depth of an electrode below the surface of a substrate support), temperature sensors (e.g., to measure temperature of the surface of the substrate support), surface profiling devices, etc. Substrate support data 154 includes data generated by a physics-based digital twin model in view of measurement data from sensor assembly 195 (e.g., sensor assembly data 152). Substrate support data 154 provides characterization of the performance of a substrate support. Sensor assembly data, substrate support data, and metrology data may contain historical data (e.g., at least a portion for training various models represented in FIG. 1 by model 190). Metrology data 160 may be metrology data of produced substrates, as well as sensor data, manufacturing data, and model data corresponding to those products. Metrology data 160 may be leveraged to design processes for making further substrates. Predictive data 168 may include predictions of metrology data resulting from operation of a substrate support, predictions of component drift, aging, or failure, predictions of component lifetimes, etc. Predictive data 168 may also include data indicative of components of system 100 aging and failing over time.

In some embodiments, predictive system 110 further includes server machine 170 and server machine 180. Server machine 170 includes a data set generator 172 that is capable of generating data sets (e.g., a set of data inputs and a set of target outputs) to train, validate, and/or test model 190. Some operations of data set generator 172 are described in detail below with respect to FIGS. 2 and 4A. In some embodiments, data set generator 172 may partition historical data (e.g., historical sensor assembly data, historical metrology data, etc.) and physical model data (e.g., substrate support data 162) into a training set (e.g., sixty percent of the data), a validating set (e.g., twenty percent of the data), and a testing set (e.g., twenty percent of the data). In some embodiments, predictive system 110 (e.g., via predictive component 114) generates multiple sets of features. For example a first set of features may correspond to a first set of types of sensor data (e.g., from a first set of sensors, first combination of values from first set of sensors, first patterns in the values from the first set of sensors) that correspond to each of the data sets (e.g., training set, validation set, and testing set) and a second set of features may correspond to a second set of types of sensor data (e.g., from a second set of sensors different from the first set of sensors, second combination of values different from the first combination, second patterns different from the first patterns) that correspond to each of the data sets.

Server machine 180 includes a training engine 182, a validation engine 184, selection engine 185, and/or a testing engine 186. An engine (e.g., training engine 182, a validation engine 184, selection engine 185, and a testing engine 186) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 may be capable of training a model 190 using one or more sets of features associated with the training set from data set generator 172. The training engine 182 may generate multiple trained models 190, where each trained model 190 corresponds to a distinct set of features of the training set (e.g., sensor data from a distinct set of sensors). For example, a first trained machine learning model may have been trained using all features (e.g., X1-X5), a second trained machine learning model may have been trained using a first subset of the features (e.g., X1, X2, X4), and a third trained machine learning model may have been trained using a second subset of the features (e.g., X1, X3, X4, and X5) that may partially overlap the first subset of features. Data set generator 172 may receive the output of a trained model (e.g., 190), collect that data into training, validation, and testing data sets, and use the data sets to train a second model. Some or all of the operations of server machine 180 may be used to train various types of models, including physics-based models, supervised machine learning models, unsupervised machine learning models, etc.

The validation engine 184 may be capable of validating a trained model 190 using a corresponding set of features of the validation set from data set generator 172. For example, a first trained model 190 that was trained using a first set of features of the training set may be validated using the first set of features of the validation set. The validation engine 184 may determine an accuracy of each of the trained models 190 based on the corresponding sets of features of the validation set. The validation engine 184 may discard trained models 190 that have an accuracy that does not meet a threshold accuracy. In some embodiments, the selection engine 185 may be capable of selecting one or more trained models 190 that have an accuracy that meets a threshold accuracy. In some embodiments, the selection engine 185 may be capable of selecting the trained model 190 that has the highest accuracy of the trained models 190.

The testing engine 186 may be capable of testing a trained model 190 using a corresponding set of features of a testing set from data set generator 172. For example, a first trained model 190 that was trained using a first set of features of the training set may be tested using the first set of features of the testing set. The testing engine 186 may determine a trained model 190 that has the highest accuracy of all of the trained models based on the testing sets.

Model 190 may refer to a physics-based digital twin model of a substrate support. The physics-based model is configured to solve equations describing the flow of heat, energy, etc., in and around the substrate support. Measurements performed by sensor assembly 195 inform parameters of the physics-based model. The physics-based model may be refined by further training, e.g., measuring steady-state temperature of the surface of the substrate support with various voltages applied to the heater electrodes, and supplying the data to the physics-based model to further refine operations of the physics-based model.

Model 190 may refer to a machine learning model, which may be the model artifact that is created by the training engine 182 using a training set that includes data inputs and corresponding target outputs (correct answers for respective training inputs). Patterns in the data sets can be found that map the data input to the target output (the correct answer), and the machine learning model 190 is provided mappings that captures these patterns. In some embodiments, machine learning model 190 may predict properties of substrates. In some embodiments, machine learning model 190 may predict failure modes of manufacturing chamber components.

Predictive component 114 may provide input data to a trained machine learning model 190 and may run the trained machine learning model 190 on the input to obtain one or more outputs. Predictive component 114 may be capable of determining (e.g., extracting) predictive data 168 from the output of the trained machine learning model 190 and may determine (e.g., extract) confidence data from the output that indicates a level of confidence that the predictive data 168 is an accurate predictor of a process associated with the input data for products produced or to be produced, or an accurate predictor of components of manufacturing equipment 124. Predictive component 114 may be capable of determining predictive data 168, including predictions on finished substrate properties and predictions of effective lifetimes of components of manufacturing equipment 124, sensors 126, or metrology equipment 128 based on the output of model 190. Predictive component 114 or corrective action component 122 may use the confidence data to decide whether to cause a corrective action associated with the manufacturing equipment 124 based on predictive data 168.

The confidence data may include or indicate a level of confidence. As an example, predictive data 168 may indicate the properties of a finished wafer given a set of manufacturing inputs, including the use of a substrate support described with substrate support data 154. The confidence data may indicate that the predictive data 168 is an accurate prediction for products associated with at least a portion of the input data. In one example, the level of confidence is a real number between 0 and 1 inclusive, where 0 indicates no confidence that the predictive data 168 is an accurate prediction for products processed according to input data and 1 indicates absolute confidence that the predictive data 168 accurately predicts properties of products processed according to input data. Responsive to the confidence data indicating a level of confidence below a threshold level for a predetermined number of instances (e.g., percentage of instances, frequency of instances, total number of instances, etc.) the predictive component 116 may cause the trained machine learning model 190 to be re-trained (e.g., based on current sensor data 146, current manufacturing parameters 150, etc.).

For purpose of illustration, rather than limitation, aspects of the disclosure describe the training of one or more models 190 using historical data and inputting current data into the one or more trained models 190 to determine predictive data 168. In other implementations, a heuristic model or rule-based model is used to determine predictive data (e.g., without using a trained machine learning model). Predictive component 114 may monitor historical data and metrology data 160. Any of the information described with respect to data inputs 210 of FIG. 2 may be monitored or otherwise used in the heuristic or rule-based model.

In some embodiments, the functions of client device 120, predictive server 112, server machine 170, and server machine 180 may be provided by a fewer number of machines. For example, in some embodiments server machines 170 and 180 may be integrated into a single machine, while in some other embodiments, server machine 170, server machine 180, and predictive server 112 may be integrated into a single machine. In some embodiments, client device 120 and predictive server 112 may be integrated into a single machine.

In general, functions described in one embodiment as being performed by client device 120, predictive server 112, server machine 170, and server machine 180 can also be performed on predictive server 112 in other embodiments, if appropriate. In addition, the functionality attributed to a particular component can be performed by different or multiple components operating together. For example, in some embodiments, predictive server 112 may determine the corrective action based on the predictive data 168. In another example, client device 120 may determine the predictive data 168 based on output from the trained machine learning model or the physics-based digital twin model.

In addition, the functions of a particular component can be performed by different or multiple components operating together. One or more of predictive server 112, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Embodiments of the disclosure may be applied to data quality evaluation, feature enhancement, model evaluation, Virtual Metrology (VM), Predictive Maintenance (PdM), limit optimization, or the like.

Although embodiments of the disclosure are discussed in terms of generating predictive data 168 to perform a corrective action in manufacturing facilities (e.g., semiconductor manufacturing facilities), embodiments may also be generally applied to improved data processing by utilizing physics-informed digital twin models and sensor assemblies to characterize substrate supports.

Figure 2:
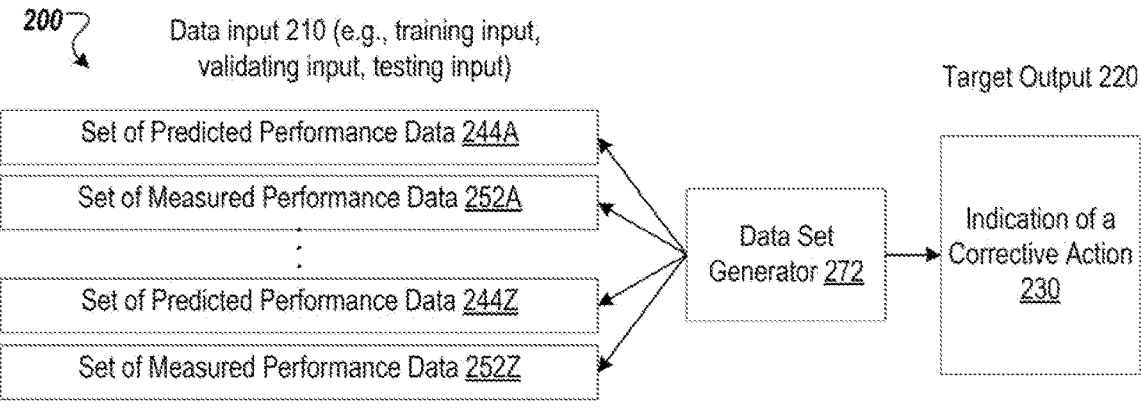
FIG. 2 is a block diagram of an example data set generator used to create data sets for a model, according to some embodiments.

FIG. 2 is a block diagram of an example data set generator 272 (e.g., data set generator 172 of FIG. 1), used to create data sets for a model (e.g., model 190 of FIG. 1), according to some embodiments. A data set generator 272 may be part of server machine 170 of FIG. 1. In some embodiments, system 100 of FIG. 1 includes multiple models. In such cases, each model may have a separate data set generator, or models may share a data set generator. Depicted in FIG. 2 is a data set generator associated with a machine learning model configured to take as input predicted performance data of substrates to be produced using a substrate support and measured performance data (e.g., metrology data) of substrate produced using the same substrate support, and provide out output information indicative of a corrective action associated with a manufacturing fault, component failure, component drift, or the like responsible for a difference between the predicted performance data and measured performance data.

Referring to FIG. 2, system 200 containing data set generator 272 (e.g., data set generator 172 of FIG. 1) creates data sets for a machine learning model (e.g., model 190 of FIG. 1). Data set generator 272 may create data sets using data retrieved as output from a physics-based digital twin model. In some embodiments, data set generator 272 creates training input from predicted performance data of substrates produced using a substrate support and measured performance data of substrates produced using the substrate support. Data set generator 272 also generates target output 220 for training a machine learning model. Target output includes data indicative of a corrective action to address an underlying cause for differences between predicted performance data and measured performance data, e.g. a manufacturing fault. Training input data 210 and target output data 220 are supplied to a machine learning model.

It is within the scope of this disclosure for training input 210 and target output 220 to be represented in a variety of different ways. A two-dimensional map of substrate properties, a function recreating the map, or other data indicative of performance data of a substrate may be used as training input 210, with similar flexibility in target output 220.

In some embodiments, data set generator 272 generates a data set (e.g., training set, validating set, testing set) that includes one or more data inputs 210 (e.g., training input, validating input, testing input) and may include one or more target outputs 220 that correspond to the data inputs 210. The data set may also include mapping data that maps the data inputs 210 to the target outputs 220. Data inputs 210 may also be referred to as "features," "attributes," or "information." In some embodiments, data set generator 272 may provide the data set to the training engine 182, validating engine 184, or testing engine 186 of FIG. 1, where the data set is used to train, validate, or test machine learning model 190 of FIG. 1. Some embodiments of generating a training set may further be described with respect to FIG. 4A.

In some embodiments, data set generator 272 may generate a first data input corresponding to a first set of predicted performance data 244A and a first set of measured performance data 252A to train, validate, or test a first machine learning model and the data set generator 272 may generate a second data input corresponding to a second set of predicted performance data 244A and a second set of measured performance data 252B to train, validate, or test a second machine learning model.

In some embodiments, data set generator 272 may perform operations on one or more of data input 210 and target output 220. Data set generator 272 may extract patterns from the data (slope, curvature, etc.), may combine data (average, feature production, etc.), or may separate data into groups (e.g., train a model on a subset of the predicted performance data) and use the groups to train separate models.

Data inputs 210 and target outputs 220 to train, validate, or test a machine learning model may include information for a particular substrate support (e.g., a particular substrate chuck assembly). Data inputs 210 and target outputs 220 may include information for a particular substrate support design (e.g., used for all substrate supports of that design). Data inputs 210 and target outputs 220 may include information for a particular type of processing, target substrate design, target substrate property, or may be grouped together in another way.

In some embodiments, data set generator 272 may generate a set of target output 220, including indication of a corrective action 230. Target output 220 may be separated into sets corresponding to sets of input data. Different sets of target output 220 may be used in connection with the similarly defined sets of data input 210, including training different models, using different sets for training, validating, and testing, etc.

Target output 220 may be generated by correlating trends in performance data to appropriate corrective actions using a method other than machine learning. A user may indicate that performing a particular corrective action addressed a difference between historical predicted performance and measured performance, a manufacturing fault may be intentionally introduced to generate data useful for training, etc. In some embodiments, a model may be trained without target output 220 (e.g., an unsupervised or semi-supervised model). A model trained that is not provided with target output may, for example, be trained to recognize significant (e.g., outside an error threshold) differences between predicted and measured performance data.

In some embodiments, the information used to train the machine learning model may be from specific types of manufacturing equipment (e.g., manufacturing equipment 124 of FIG. 1) of the manufacturing facility having specific characteristics and allow the trained machine learning model to determine outcomes for a specific group of manufacturing equipment 124 based on input of predicted performance data and measured performance data associated with one or more components sharing characteristics of the specific group. In some embodiments, the information used to train the machine learning model may be for components from two or more manufacturing facilities and may allow the trained machine learning model to determine outcomes for components based on input from one manufacturing facility.

In some embodiments, subsequent to generating a data set and training, validating, or testing a machine learning model using the data set, the machine learning model may be further trained, validated, or tested, or adjusted.

Figure 3:
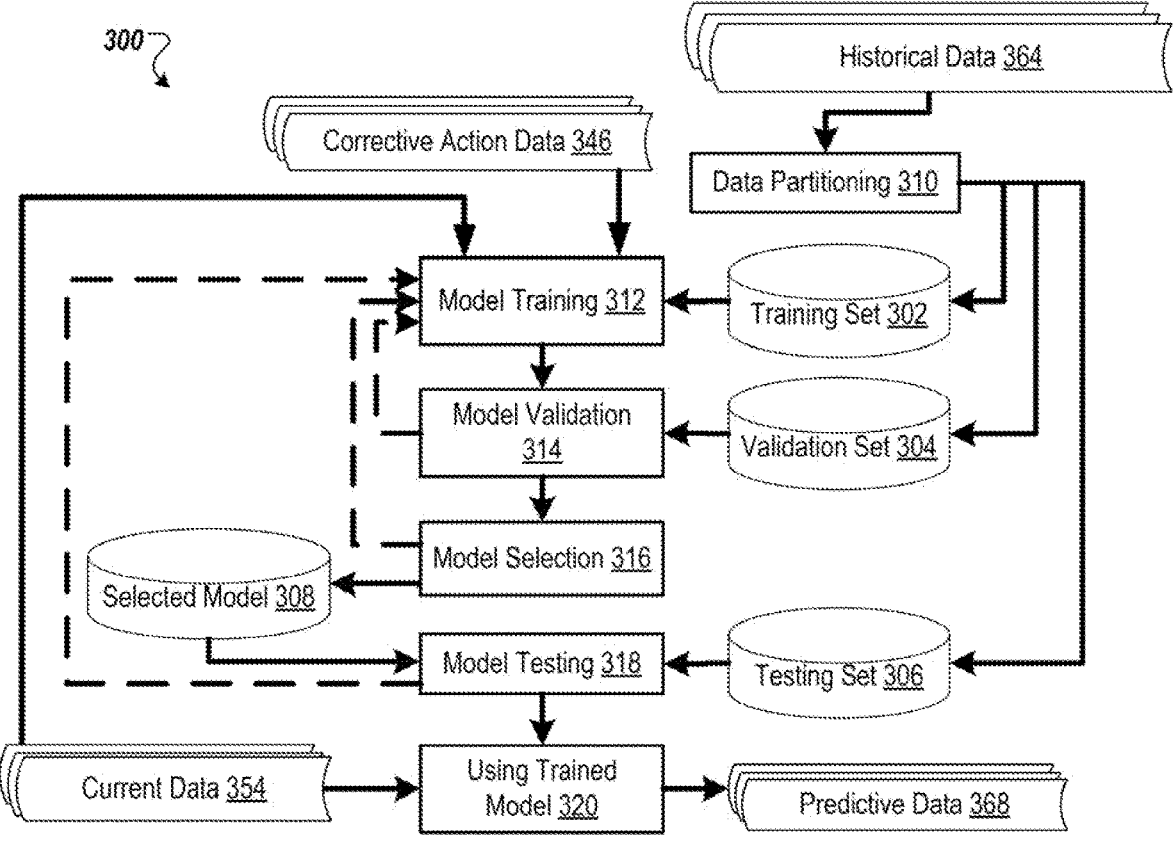
FIG. 3 is a block diagram illustrating system for generating output data (e.g., predictive data 168 of FIG. 1), according to some embodiments

FIG. 3 is a block diagram illustrating system 300 for generating output data (e.g., predictive data 168 of FIG. 1), according to some embodiments. System 300 may be used to analyze differences between predicted performance data and measured performance data of substrates, and provide predictive data indicative of a corrective action in view of the differences. A system similar to system 300 may be used for other models, such as a machine learning model that correlates substrate support characterization and recipe inputs to predict substrate properties. Some or all of the operations of system 300 may be used to generate data indicative of characterization of a substrate support via a physics-based digital twin model. In these cases, other data may be used as input and produced as output by system 300, as appropriate.

Referring to FIG. 3, at block 310, the system 300 (e.g., components of predictive system 110 of FIG. 1) performs data partitioning (e.g., via data set generator 172 of server machine 170 of FIG. 1) of historical data 364 (e.g., historical predicted performance data and measured performance data of substrates, and historical corrective actions performed) to generate training set 302, validation set 304, and testing set 306. For example, the training set may be 60% of the performance data, the validation set may be 20% of the performance data, and the testing set may be 20% of the performance data.

At block 312, the system 300A performs model training (e.g., via training engine 182 of FIG. 1) using the training set 302. The system 300 may train one model or may train multiple models using multiple sets of features of the training set 302 (e.g., a first set of features including a subset of performance data of the training set 302, a second set of features including a different subset of performance data of the training set 302, etc.). For example, system 300 may train a machine learning model to generate a first trained machine learning model using the first set of features in the training set and to generate a second trained machine learning model using the second set of features in the training set (e.g., different data than the data used to train the first machine learning model). In some embodiments, the first trained machine learning model and the second trained machine learning model may be combined to generate a third trained machine learning model (e.g., which may be a better predictor than the first or the second trained machine learning model on its own). In some embodiments, sets of features used in comparing models may overlap (e.g., one model may be trained with performance data indicative of film thickness, and another model with performance data indicative of both film thickness and film stress, different models may be trained with data from different locations of a substrate, etc.). In some embodiments, hundreds of models may be generated including models with various permutations of features and combinations of models.

At block 314, the system 300 performs model validation (e.g., via validation engine 184 of FIG. 1) using the validation set 304. System 300 may validate each of the trained models using a corresponding set of features of the validation set 304. For instance, validation set 304 may use the same subset of performance data used in training set 302, but for different input conditions. In some embodiments, the system 300A may validate hundreds of models (e.g., models with various permutations of features, combinations of models, etc.) generated at block 312. At block 314, the system 300 may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. The system 300 may discard the trained machine learning models that have an accuracy that is below the threshold accuracy (e.g., based on the validation set).

At block 316, the system 300 may perform model selection (e.g., via selection engine 185 of FIG. 1) to determine which of the one or more trained models that meet the threshold accuracy has the highest accuracy (e.g., the selected model 308, based on the validating of block 314). If only a single model was trained, then the operations of block 316 may be skipped. Responsive to determining that two or more of the trained models that meet the threshold accuracy have the same accuracy, flow may return to block 312 where the system 300 performs model training using further refined training sets corresponding to further refined sets of features for determining a trained model that has the highest accuracy.

At block 318 system 300 performs model testing (e.g., via testing engine 186 of FIG. 1) using the testing set 306 to test the selected model 308. The system 300 may test, using the first set of features in the testing set, the first trained machine learning model to determine the first trained machine learning model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and is not applicable to other data sets such as the testing set 306), flow continues to block 312 where the system 30A performs model training (e.g., retraining) using different training sets possibly corresponding to different sets of features or a reorganization of substrates split into training, validation, and testing sets. Responsive to determining that the selected model 308 has an accuracy that meets a threshold accuracy based on the testing set 306, flow continues to block 320. In at least block 312, the model may learn patterns in the simulated sensor data to make predictions and in block 318, the system 300 may apply the model on the remaining data (e.g., testing set 306) to test the predictions.

At block 320, system 300 uses the trained model (e.g., selected model 308) to receive current data 354 (e.g., predicted performance data and measured performance data of a substrate not included in historical data 364) and determines (e.g., extracts), from the output of the trained model, predictive data 368 (e.g., predictive data 168 of FIG. 1) to perform an action (e.g., perform a corrective action in association with manufacturing equipment 124 of FIG. 1, provide and alert to client device 120 of FIG. 1, etc.).

In some embodiments, retraining of the machine learning model occurs by supplying additional data to further train the model. Current data 354 may be provided at block 312. Additional corrective action data 346 may be provided as well. These data may be different from the data originally used to train the model by incorporating combinations of input parameters not part of the original training, input parameters outside the parameter space spanned by the original training, or may be updated to reflect chamber specific knowledge (e.g., differences from an ideal chamber due to manufacturing tolerance ranges, aging components, etc.). Selected model 308 may be retrained based on this data.

In some embodiments, one or more of the acts 310-320 may occur in various orders and/or with other acts not presented and described herein. In some embodiments, one or more of acts 310-320 may not be performed. For example, in some embodiments, one or more of data partitioning of block 310, model validation of block 314, model selection of block 316, or model testing of block 318 may not be performed. In training a physics-based digital twin model, e.g., to take as input measurements of a substrate support and produce as output predicted performance data of the substrate support, a subset of these operations may be performed.

FIGS. 4A-E are flow diagrams of methods 400A-E associated with characterizing a substrate support to cause a corrective action, according to certain embodiments. Methods 400A-E may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 400A-E may be performed, in part, by predictive system 110. Method 400A may be performed, in part, by predictive system 110 (e.g., server machine 170 and data set generator 172 of FIG. 1, data set generator 272 of FIG. 2). Predictive system 110 may use method 400A to generate a data set to at least one of train, validate, or test a model, in accordance with embodiments of the disclosure. The model may be a physics-based digital twin model (e.g., to generate predictive performance data of a substrate support), a machine learning model (e.g., to generate predictive performance data of a wafer, to generate data indicative of a corrective action associated with a component of manufacturing equipment, etc.), a statistical model, or another model trained to receive input and generate output related to substrate support characterization. Methods 400B-C may be performed by predictive server 112 (e.g., predictive component 114, etc.). Method 400D may be performed by server machine 180 (e.g., training engine 182). Method 400E may be performed by predictive server 112 (e.g., predictive component 114), client device 120 (e.g., corrective action component 122), etc. In some embodiments, a non-transitory storage medium stores instructions that when executed by a processing device (e.g., of predictive system 110, of server machine 180, of predictive server 112, etc.) cause the processing device to perform one or more of methods 400A-E.

For simplicity of explanation, methods 400A-E are depicted and described as a series of operations. However, operations in accordance with this disclosure can occur in various orders and/or concurrently and with other operations not presented and described herein. Furthermore, not all illustrated operations may be performed to implement methods 400A-E in accordance with the disclosed subject matter. In addition, those skilled in the art will understand and appreciate that methods 400A-E could alternatively be represented as a series of interrelated states via a state diagram or events.

Figure 4A:
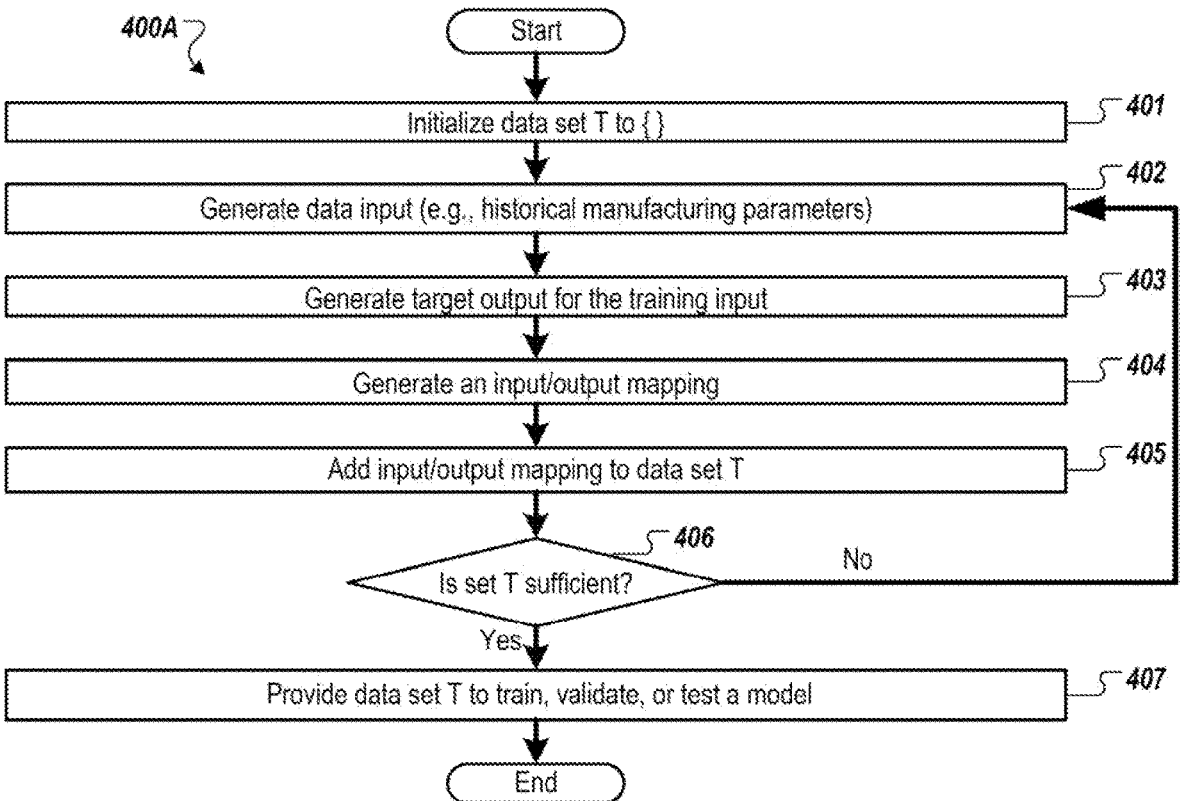

FIG. 4A is a flow diagram of a method 400A for generating a data set for a machine learning model for generating predictive data (e.g., predictive data 168 of FIG. 1), according to certain embodiments.

Referring to FIG. 4A, in some embodiments, at block 401 the processing logic implementing method 400A initializes a training set T to an empty set.

At block 402, processing logic generates first data input (e.g., first training input, first validating input) that may include sensor assembly data, substrate support performance data, measured substrate performance data, substrate metrology data (e.g., film properties such as thickness, material composition, optical properties, roughness, and so on), etc. In some embodiments, the first data input may include a first set of features for types of data and a second data input may include a second set of features for types of data (e.g., as described with respect to FIG. 3).

At block 403, processing logic generates a first target output for one or more of the data inputs (e.g., first data input). In some embodiments, the first target output is performance data of substrates. In some embodiments, the first target output is data indicative of a corrective actions. In some embodiments, no target output is generated (e.g., for training an unsupervised machine learning model)

At block 404, processing logic optionally generates mapping data that is indicative of an input/output mapping. The input/output mapping (or mapping data) may refer to the data input (e.g., one or more of the data inputs described herein), the target output for the data input, and an association between the data input(s) and the target output. In some embodiments (e.g., those without target output data) these operations may not be performed.

At block 405, processing logic adds the mapping data generated at block 404 to data set T, in some embodiments.

At block 406, processing logic branches based on whether data set T is sufficient for at least one of training, validating, and/or testing model 190 of FIG. 1. If so, execution proceeds to block 407, otherwise, execution continues back at block 402. It should be noted that in some embodiments, the sufficiency of data set T may be determined based simply on the number of inputs, mapped in some embodiments to outputs, in the data set, while in some other implementations, the sufficiency of data set T may be determined based on one or more other criteria (e.g., a measure of diversity of the data examples, accuracy, etc.) in addition to, or instead of, the number of inputs.

At block 407, processing logic provides data set T (e.g., to server machine 180 of FIG. 1) to train, validate, and/or test model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing.

FIG. 4B is a method 400B for characterizing a substrate support, according to some embodiments. At block 410 of method 400B, measurements of a substrate support are taken. A different processing device may perform the operations of block 410 than the processing device (or devices) that performs other operations of method 400B. In preparation for performing the operations of block 410, a sensor assembly including one or more sensors is disposed proximate to a substrate support to be characterized. In some embodiments, the area of the substrate support may be larger than the area within the field of view of the sensors of the sensor assembly. The sensor assembly and the substrate support may be disposed on a movable support, such that the sensor assembly and the substrate support are proximate, and relative motion between the two may be caused (e.g., the assembly and/or the substrate support mounted on a stage movable in two or three spatial dimensions). The sensor assembly is then positioned at a number of different positions relative to the substrate support. One or more measurements are then generated by sensors of the sensor assembly at each of the positions. By causing relative motion in at least two dimensions, the entire surface of the substrate support may be measured. In some embodiments, a smaller region of the surface of the substrate support may be measured (e.g., a portion suspected to be problematic). A two-dimensional map of measurements of the surface of the substrate support may be generated using this method. Measurements may include electrode depth below the surface of the substrate, surface profile, surface temperature, etc. Measurements may be indicative of the properties of the substrate support.

At block 412, processing logic receives data indicative of properties of the substrate support from sensors of the removable sensor assembly. The data received may be measurement data paired with location data, a two-dimensional map of properties, or may be expressed in another form. Data may include data from different types of sensors, including capacitance sensors, temperature sensors, surface profiling devices, etc. The data may be processed in some way, e.g., removal of outliers, statistical processing (e.g., boxcar averaging, smoothing), etc., at times corresponding to this or other operations of method 400B.

At block 414, processing logic provides data based on the data received at block 412 (e.g., data indicative of properties of a substrate support) to a physics-based digital twin model of the substrate support. The physics-based model may be configured to receive data indicative of measurements of properties of a substrate support. The physics-based model may be configured to provide solutions to equations, such as equations describing heat transfer, energy balance, or the like. The physics-based model may be configured to output predictive performance data of the substrate support.

At block 416, processing logic receives predicted performance data of the substrate support from the physics-based digital twin model of the substrate support. The physics-based digital twin may have previously been trained using historical data. Predicted performance data may predict conditions at the location of a substrate to be processed using the substrate support. In some embodiments, predicted performance data of the substrate support includes a prediction of temperature profile at the location of the substrate. Predicted performance data of the substrate support may include a prediction of a temperature profile (e.g., two-dimensional temperature map) at the location of the substrate for a particular set of inputs (e.g., power supplied to various heater electrodes included in the substrate support). In some embodiments, predicted performance data of the substrate support may include predictions of properties other than temperature, such as chucking force, RF power, heat transfer, etc. These properties may also depend on input values (e.g., power supplied to chucking electrode, etc.). Predicted performance data of the substrate support may further be used to obtain predicted performance data of a substrate processed using the substrate support (e.g., predicted metrology data), as discussed in more detail in connection with FIG. 4C. Predicted performance data of the substrate may be provided by a trained machine learning model.

At block 418, processing logic may receive second predicted performance data of the substrate support. The second predicted performance data is based on second sensor assembly data, collected at a different time (e.g., later time) than the first sensor assembly data received at block 412. The second sensor assembly data may have been generated after processing of some substrates using the substrate support, e.g., the second sensor assembly data may be used to quantify the effect that processing a number of substrates has had on the substrate support. The processing logic may perform many of the operations included in method 400B to generate the second predicted performance data of the substrate support, as described above in connection with generating first predicted performance data of the substrate support. Processing logic may receive second data indicative of predicted performance of the substrate support, generated by the trained physics-based model in view of the second sensor assembly data.

At block 419, processing logic may cause performance of a corrective action in view of the second predicted performance data of the substrate support. The processing logic may determine at least one difference between the first data indicative of predicted performance data of the substrate support and second data indicative of predicted performance data of the substrate support. In some embodiments, processing logic may compare first sensor assembly data indicative of properties of the substrate support to second sensor assembly data indicative of properties of the substrate support. A corrective action may be performed in view of the at least one difference, e.g., schedule replacement or maintenance of a degrading component of the manufacturing chamber. Measurements of the substrate support taken over time may indicate drift, failure, lifetime estimate, etc. of the substrate support. Measurements of the substrate support taken over time may also provide information about other components of the manufacturing chamber. Uneven wear on the surface of the substrate support, for instance, may indicate a problem with robotic handles that place and remove substrates from the substrate support, etc. Operations of blocks 410, 418, and 419 of method 400B may be separated from the operations of other blocks of method 400B. For instance, operations of blocks 410, 418, and/or 419 may be performed at a different time, performed by a different processing device, may not be included in method 400B, etc., as indicated by the dashed boxes of FIG. 4B.

FIG. 4C is a flow diagram of method 400C for causing performance of a corrective action, according to some embodiments. Method 400C may be performed by processing logic subsequent to performance of a method for characterizing a substrate support such as method 400B. Processing logic may receive, from sensors of a sensor assembly, data indicative of properties of a substrate support. Processing logic may provide the data indicative of properties of a substrate support to a physics-based digital twin model of the substrate support.

At block 420, processing logic receives predicted performance data of the substrate support from the physics-based model.

At block 422, processing logic determines predicted properties of a substrate to be produced using the substrate support, in view of the predicted performance data of the substrate support. In some embodiments, predicted properties of substrates are generated as output from a trained machine learning model. In some embodiments, predicted properties of substrates take the form of a two-dimensional map of properties of the substrate. In some embodiments, the two-dimensional map may be a map of film thickness, etch rate, film stress, or other properties of a substrate.

At block 424, processing logic causes performance of a corrective action in view of the predicted properties of a substrate to be processed using the substrate support. Determination of a corrective action to be performed may be in view of output of a trained machine learning model. The corrective action may include one or more of sending an alert to a user, scheduling corrective maintenance, scheduling preventative maintenance, updating a process recipe, updating a calibration table or an equipment constant (e.g., a parameter that is associated with one or more process recipes), correcting for chamber drift, etc. Chamber drift includes gradual changes to processing equipment. Such changes may include gradual changes to surfaces of chamber components caused by repeated processing of products, changes to sensors and/or sensor calibration, changes to electronics, including control electronics, etc. Chamber drift may include addition of material to surfaces (e.g., via deposition), removal of material from surfaces (e.g., via etching), etc. Changes to surfaces of components of manufacturing equipment may affect processing conditions, e.g., processing reaction rates.

Figure 4D:
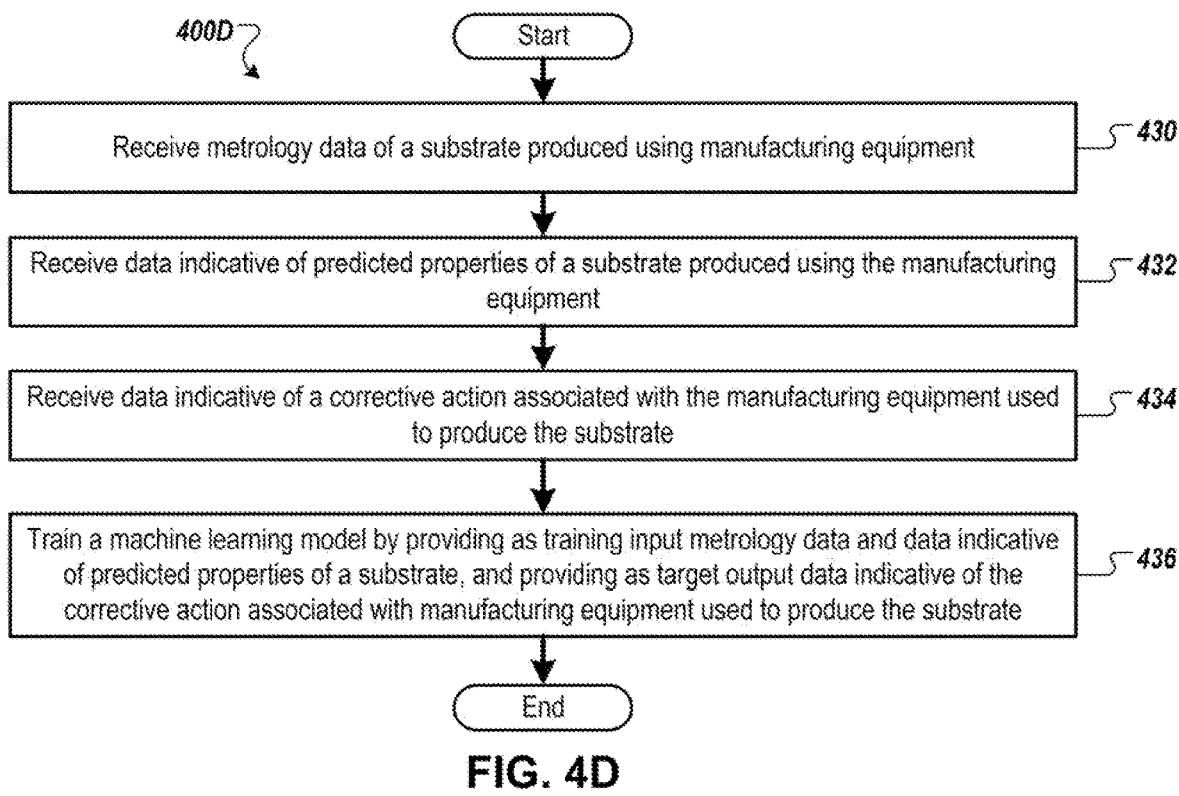

FIG. 4D is a method 400D for training a machine learning model for identifying a corrective action, according to some embodiments. Trained machine learning models may be used in connection with this disclosure in many ways. Methods 400D-E describe methods associated with a machine learning model that receives as input metrology data of a substrate and predicted metrology data of the substrate, determines differences between the two data, and provides as output data indicative of a corrective action. Other machine learning models are also within the scope of this disclosure, such as a model that takes as input predicted substrate support performance data, and produces as output predicted substrate properties. Machine learning models may also be used differently, e.g., a model may take as input metrology data of a substrate and predicted metrology data of a substrate (similar to the input of the machine learning model of methods 400D-E) and produce, as an unsupervised machine learning model, output indicative of significant (e.g., greater than some threshold) differences between the measured and predicted data.

At block 430, processing logic receives metrology data of a substrate produced using manufacturing equipment. The manufacturing equipment includes a characterized substrate support (e.g., characterized using a method such as method 400B). At block 432, processing logic receives data indicative of predicted properties of a substrate produced using the manufacturing data. The data indicative of predicted properties may have been received as the output of a trained machine learning model. The data indicative of predicted properties of a substrate may have been generated in view of characterization of a substrate support, as output by a trained physics-based digital twin model.

At block 434, processing logic receives data indicative of a corrective action associated with the manufacturing equipment used to produce the substrate. The data indicative of the corrective action may have been generated by a user performing the corrective action, finding it to improve the manufacturing equipment associated with the substrate, and providing it to the processing logic. The data indicative of the corrective action may have been generated by a user intentionally producing the substrate in a non-optimal manner to obtain predicted and measured properties of a substrate related to a specific corrective action associated with the way the user configured the manufacturing equipment.

At block 436, processing logic causes a machine learning model to be trained, by providing as training input data indicative of metrology data of the substrate and data indicative of predicted properties of the substrate, and providing as target output data indicative of the corrective action associated with manufacturing equipment used to produce the substrate.

Figure 4E:
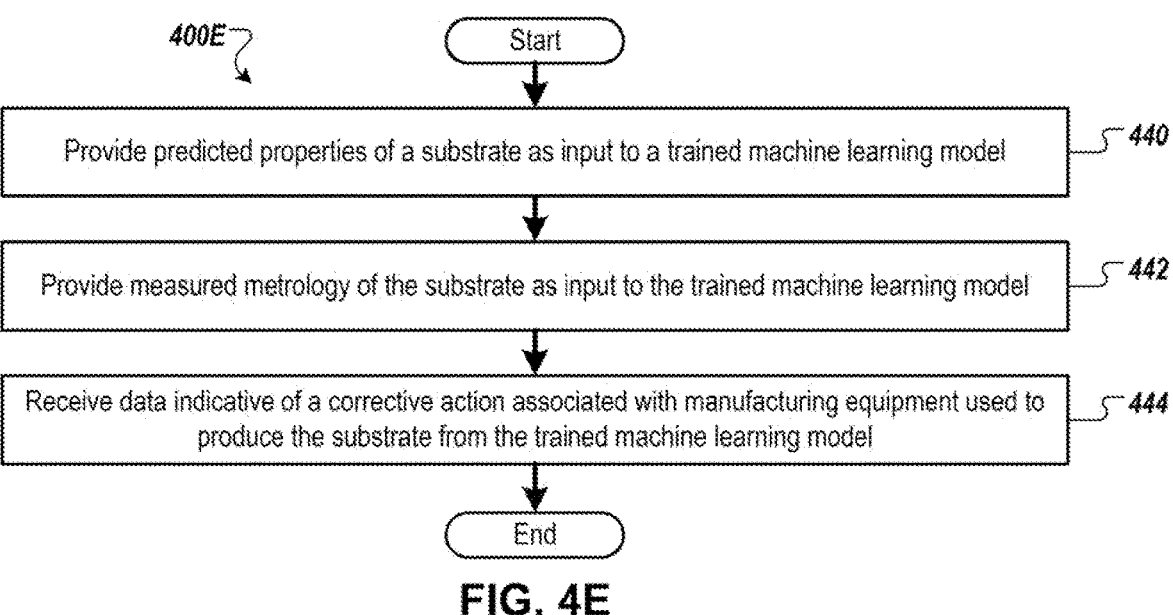

FIG. 4E is a flow diagram of a method 400E for using a trained machine learning model to determine a corrective action, according to some embodiments. At block 440, processing logic provides predicted properties of a substrate as input to a trained machine learning model. The predicted properties of the substrate may have been generated by another trained machine learning model. The predicted properties of the substrate (e.g., film thickness, surface roughness, optical or chemical properties, etc.) may have been generated in view of predicted performance properties of a substrate support (e.g., a two-dimensional map of predicted temperature at the substrate with given input conditions), as output by a trained physics-based digital twin model of the substrate support.

At block 442, processing logic provides measured metrology data of the substrate as input to the trained machine learning model. The measured metrology data is associated with a substrate processed using the same equipment, processing parameters, etc., as the inputs to the physics-based model used in generation of predicted properties of the substrate. Metrology data may include substrate film thickness, surface roughness, optical properties, chemical composition, etc.

At block 444, processing logic receives data from the trained machine learning model. The data is indicative of a corrective action associated with manufacturing equipment used to produce the substrate. The corrective action may be any of the corrective actions discussed in association with this disclosure, for instance in connection with FIG. 4D. In some embodiments, the processing logic may then cause performance of the corrective action. The trained machine learning model of method 4E may include one or more of a neural network (e.g., artificial neural network), Support Vector machine, Radial Basis Function, clustering, k-Nearest Neighbor algorithm, random forest, etc. The corrective action may indicate a fault in the substrate support, e.g., metrology data indicative of hot spots (e.g., metrology indicating areas of elevated temperature during processing using the substrate support) may indicate a problem with lift pins of the substrate support, metrology data indicative of a temperature gradient may indicate a problem with robotic handlers not placing the substrate on the substrate support correctly, etc.

Figure 5:
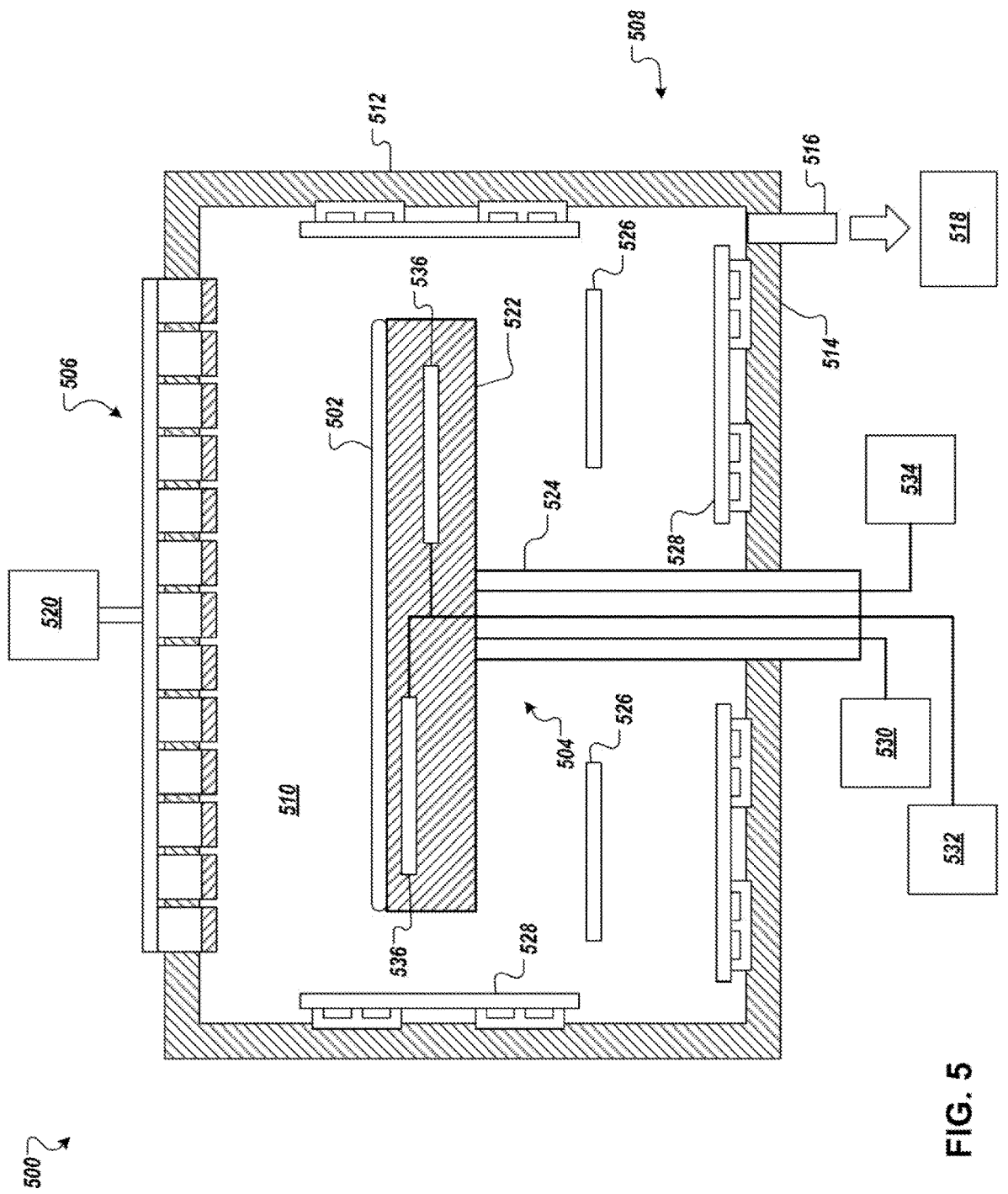
FIG. 5 depicts a sectional view of a manufacturing chamber (e.g., a semiconductor wafer manufacturing chamber) according to some embodiments.

FIG. 5 depicts a sectional view of a manufacturing chamber 500 (e.g., a semiconductor wafer manufacturing chamber) according to some aspects of this disclosure. Manufacturing chamber 500 may be one or more of an etch chamber, deposition chamber (including atomic layer deposition, chemical vapor deposition, physical vapor deposition, or plasma enhanced versions thereof), anneal chamber, or the like. For example, manufacturing chamber 500 may be a chamber for a plasma etcher, a plasma cleaner, and so forth. Examples of chamber components may include a substrate support 504, a chuck (e.g., electrostatic chuck, vacuum chuck, etc.), a ring (e.g., a process kit ring), a chamber wall, a base, a showerhead 506, a gas distribution plate, a liner, a liner kit, a shield, a plasma screen, a flow equalizer, a cooling base, a chamber viewport, a chamber lid, a nozzle and so on.

In one embodiment, manufacturing chamber 500 includes a chamber body 508 and a showerhead 506 that enclose an interior volume 510. In some chambers, showerhead 506 may be replaced by a lid and a nozzle. Chamber body 508 may be constructed from aluminum, stainless steel, or other suitable material. Chamber body 508 generally includes sidewalls 512 and a bottom 514.

An exhaust port 516 may be defined in chamber body 508, and may couple interior volume 510 to a pump system 518. Pump system 518 may include one or more pumps and valves utilized to evacuate and regulate the pressure of interior volume 510 of manufacturing chamber 500.

Showerhead 506 may be supported on sidewalls 512 of chamber body 508 or on a top portion of the chamber body. Showerhead 506 (or the lid, in some embodiments) may be opened to allow access to interior volume 510 of manufacturing chamber 500, and may provide a seal for manufacturing chamber 500 while closed. Gas panel 520 may be coupled to manufacturing chamber 500 to provide process or cleaning gases to interior volume 510 through showerhead 506 (or lid and nozzle). Showerhead 506 may include multiple gas delivery holes throughout. Examples of processing gases that may be used to process substrates in manufacturing chamber 500 include halogen-containing gases, such as $C_2F_6$, $SF_6$, $SiCl_4$, $HBr$, $NF_3$, $CF_4$, $CHF_3$, $F_2$, $Cl_2$, $CCl_4$, $BCl_3$, and $SiF_4$, among others, and other gases such as $O_2$ or $N_2O$. Examples of carrier gases include $N_2$, He, Ar, and other gases inert to process gases (e.g., nonreactive gases).

Substrate support 504 is disposed in interior volume 510 of manufacturing chamber 500 below showerhead 506. In some embodiments, substrate support 504 includes susceptor 522 and shaft 524. Substrate support 504 supports a substrate 502 during processing. In some embodiments, also disposed within manufacturing chamber 500 are one or more heaters 526 and reflectors 528.

Substrate support 504 may include electronics providing power and control to electrodes disposed within substrate support 504. Substrate support 504 depicted in FIG. 5 includes an electrostatic chuck assembly, substrate supports including other components are possible and within the scope of this disclosure. Substrate support 504 may include one or more clamping electrodes (not shown). Clamping electrodes may be controlled by chucking power source 530. Chucking power source 530 may include separate outputs to each clamping electrode, to enable separate control of clamping electrodes. Only one output of chucking power source 530 (and other similarly positioned components) is shown in FIG. 5 for clarity.

Substrate support 504 may include one or more heating elements 536 disposed within the support (e.g., substrate support 504 may include an electrostatic chuck heater assembly). Embedded heating elements may be regulated by a heater power source 532. Heater power source 532 may have many of the same features as chucking power source 530. As shown in FIG. 5, heating elements 536 may be disposed at different depths within the substrate support (e.g., different distances from the surface of the substrate support). Characterizing the depths of the heater elements below the surface of the substrate support informs a physics-based model of the substrate support. Other elements (chucking electrodes, RF elements, etc.) may also be disposed at various depths beneath the surface of the substrate support. In some embodiments, heating elements 536 may be subject to separate control. The physics-based digital twin model may provide as output predictive performance data of substrate support 504 that may inform set points for the various electrodes housed in substrate support 504 to reach a target property value profile or target property value profiles during substrate processing (e.g., target temperature profile on substrate). Substrate support 504 may further include one or more radio frequency (RF) elements, controlled by RF output generator 534. RF output generator 534 and RF elements may have some features in common with chucking and heating systems of substrate support 504, as described above. Other types of electrodes may also be present within the substrate support, and are within the scope of this disclosure.

In some embodiments, a removable sensor assembly may be used to measure properties of substrate support 504. Properties may include characterizing performance of electrodes within the support. Performance of the electrodes (e.g., heat transfer to the surface of substrate support 504, chucking force, etc.) may depend on the distance below the surface of the substrate support the electrodes are located. The sensor assembly may be equipped with a capacitive sensor. By, for instance, connecting an electrode to ground, a capacitive sensor may measure the depth of the electrode or heating element below the surface of the substrate support assembly (e.g., below the upper surface of an electrostatic chuck, below the upper surface of a heater, etc.). This measurement may be repeated across the surface of the substrate support to generate a map of depths of the electrodes/heating elements, and may be repeated for each electrode/heating element of interest included in the substrate support. The depth data may be provided to train a physics-based digital twin model of the substrate support. Parameters of the physics-based model (e.g., heat transfer from a heating electrode to the surface of the substrate support) may be functions of depth of the electrode below the surface.

In cases where multiple electrodes of the same type are embedded within the substrate support, individual control of the electrodes may be informed by the measurements of the sensor assembly. For example, heating electrodes that are deeper under the surface (e.g., further from the substrate being processed) may be provided additional power to account for the reduced heat transfer through the material of the substrate support.

Figure 6:
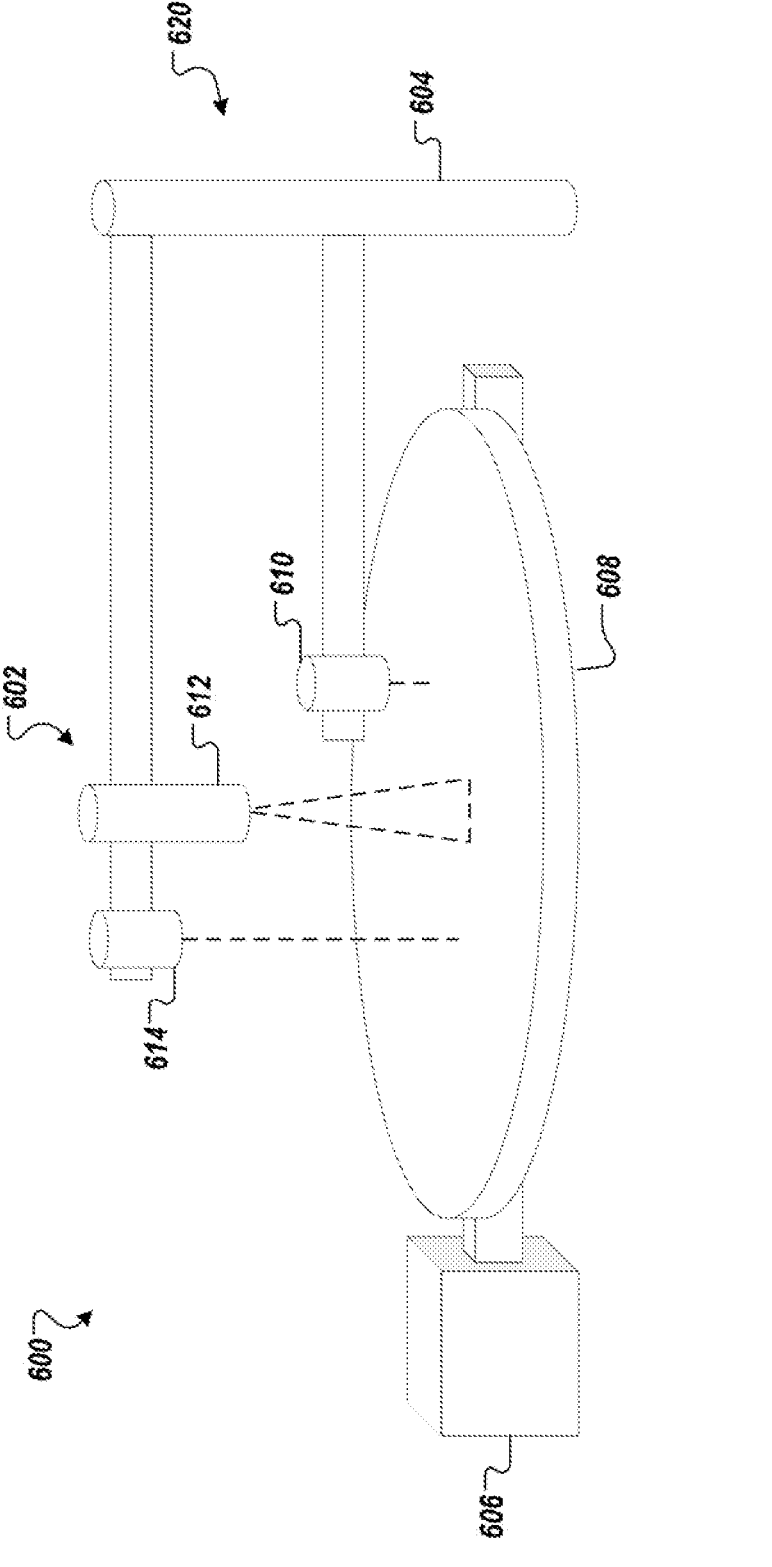
FIG. 6 is a diagram of a removable sensor assembly system, according to some embodiments

FIG. 6 is a diagram of a removable sensor assembly system 600, according to some embodiments. The geometry, arrangement of sensors, location of components, etc. depicted in FIG. 6 is meant to illustrate elements of an embodiment of the disclosure, and not to limit the scope of this disclosure beyond the claims.

Sensor assembly system 600 includes removable sensor assembly 620 (e.g., sensor assembly 195 of FIG. 1), including sensors 602, disposed on stand 604 configured to have sensors mounted on it. Stand 604 may be configured to accommodate sensors with different ranges (as shown in FIG. 1 as two arms of stand 604 disposed at different distances from substrate support 608). The stand may be coupled to movable support 606 (the coupling is not shown in FIG. 6, but may include securing both stand 604 and movable support 606 to the same surface, for instance). In some embodiments, movable support 606 is coupled to substrate support 608 (e.g., substrate support 504 of FIG. 5), properties of which are to be measured by sensors 602. Movable support 606 may be configured to cause relative motion between substrate support 608 and sensors 602 in at least two dimensions (e.g., two axes). For example, the moveable support may be movable along an x-axis and a y-axis. In another example, the moveable support may be moveable along an x-axis and may be rotatable about a z-axis. In some embodiments, movable support 606 may be configured to cause relative motion in three dimensions, for example, to account for various ranges of sensors 602. Movable support 606 may be configured to cause relative motion such that the entirety of the working surface of substrate support 608 passes through the fields of view of sensors 602. A processing device may receive data indicative of the position of movable support 606, coupled with data indicative of sensor measurements of sensors 602. The processing device may be configured to produce two-dimensional maps of measured properties of substrate support 608. The processing device may also control aspects of sensor assembly system 600, e.g., sensors 602, movable support 606, etc. In some embodiments, stand 604 is coupled to movable support 606 instead of substrate support 608 being coupled to movable support 606.

In some embodiments, sensors 602 may include capacitive displacement sensor 610, infrared temperature sensor 612, and/or surface profiler 614 (e.g., laser profiler). Capacitive displacement sensor 610 may be configured to measure depth below the surface of substrate support 608 of electrodes (e.g., heating electrodes, clamping/chucking electrodes, RF electrodes, etc.). Infrared temperature sensor 612 may be configured to measure the temperature of the working surface of substrate support 608 (e.g., when heating elements are turned on, when substrate support 608 reaches steady-state surface temperature, etc.). Surface profiler 614 may be configured to measure properties of the surface of substrate support 608 (e.g., engineered surface roughness).

In some embodiments, sensors 602 are selected to provide data to a physics-based digital twin model of substrate support 608. Measured properties of the substrate support may include properties indicative of performance of a heater assembly of the substrate support. For example, heater electrode power, heater electrode depth, surface profile, and surface temperature while heaters electrodes are producing heat may all contribute to accurate predictions of temperature of a substrate being processed using substrate support 608. By measuring electrode depth, surface profile, and surface temperature, and working with a known set-point for heater electrode power, temperature of a substrate may be predicted. Other combinations of sensors or generating predictions of other properties (e.g., measuring clamping electrode depth to predict chucking force) are within the scope of this disclosure.

In some embodiments, substrate support 608 may be measured by sensors 602 outside a manufacturing chamber (e.g., before substrate support 608 is installed in a manufacturing chamber). In some embodiments, sensor assembly 620 may be disposed in a manufacturing chamber (e.g., during a planned maintenance event), and substrate support 608 measured for characterization while substrate support 608 is installed in a manufacturing chamber. In some embodiments, sensor assembly 620 may be disposed in a manufacturing chamber during a planned or unplanned maintenance event to characterize or re-characterize the substrate support of the manufacturing chamber. Performance of corrective actions may be based on characterization or re-characterization of the substrate support, as discussed in connection with FIGS. 4B, C, and E.

Figure 7:
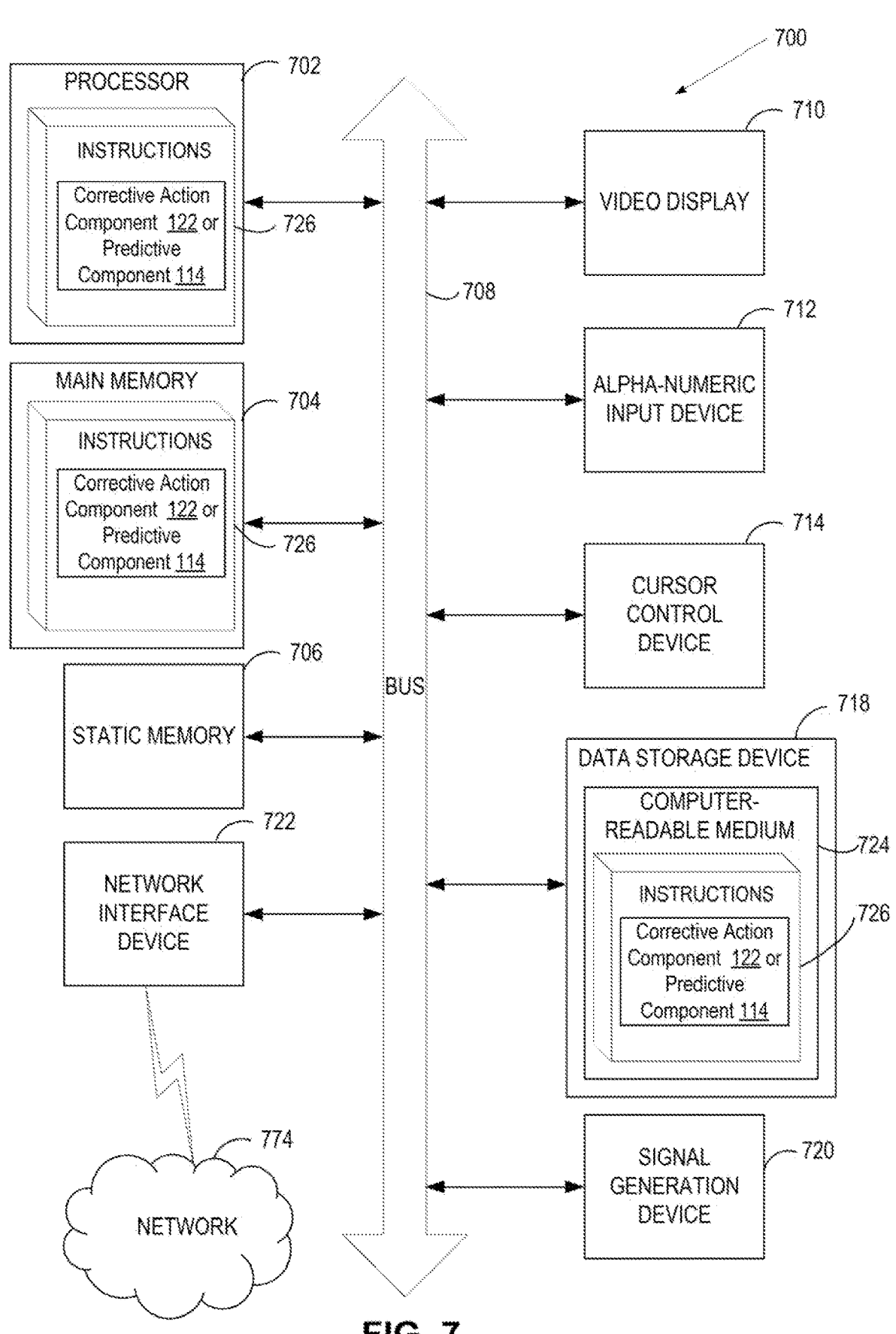
FIG. 7 is a block diagram illustrating a computer system, according to some embodiments.

FIG. 7 is a block diagram illustrating a computer system 700, according to certain embodiments. In some embodiments, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., Random Access Memory (RAM)), a non-volatile memory 706 (e.g., Read-Only Memory (ROM) or Electrically-Erasable Programmable ROM (EEPROM)), and a data storage device 718, which may communicate with each other via a bus 708.

Processing device 702 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 700 may further include a network interface device 722 (e.g., coupled to network 774). Computer system 700 also may include a video display unit 710 (e.g., an LCD), an alphanumeric input device 712 (e.g., a keyboard), a cursor control device 714 (e.g., a mouse), and a signal generation device 720.

In some implementations, data storage device 718 may include a non-transitory computer-readable storage medium 724 (e.g., non-transitory machine-readable storage medium) on which may store instructions 726 encoding any one or more of the methods or functions described herein, including instructions encoding components of FIG. 1 (e.g., predictive component 114, model 190, etc.) and for implementing methods described herein.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "providing," "obtaining," "causing," "accessing," "determining," "adding," "using," "training," "generating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:

receiving, from one or more sensors of a removable sensor assembly comprising a capacitive displacement sensor disposed proximate to a substrate support, first data indicative of properties of the substrate support, the first data comprising capacitive displacement sensor data;

determining a depth of one or more electrodes beneath a surface of the substrate support based on the first data that comprises the capacitive displacement sensor data;

providing the depth of the one or more electrodes to a model of the substrate support;

receiving, from the model, predicted performance data of the substrate support based on the depth of the one or more electrodes;

obtaining measured performance data of the substrate support; and performing a corrective action in view of one or more differences between the measured performance data and the predicted performance data.

2. The method of claim 1, wherein the one or more sensors associated with the removable sensor assembly comprise:

a capacitive sensor;

a surface profiling device; and a temperature sensor.

3. The method of claim 1, wherein the properties of the substrate support comprise properties indicative of performance of a heater assembly of the substrate support.

4. The method of claim 1, wherein the substrate support comprises an electrostatic chuck heater assembly.

5. The method of claim 1, further comprising:

moving the one or more sensors to a plurality of positions relative to the substrate support, and generating one or more measurements at the plurality of positions relative to the substrate support, wherein the data indicative of the properties of the substrate support comprises the one or more measurements.

6. The method of claim 1, wherein the first data indicative of the properties of the substrate support comprises measurements from a capacitive sensor.

7. The method of claim 1, further comprising:

generating the model of the substrate support, comprising a physics-based model of the substrate support, wherein the physics-based model comprises a digital twin model, and generating the physics-based model comprises selecting values of parameters describing heat transfer in the substrate support in view of the data indicative of the properties of the substrate support, and solving heat transfer equations describing the heat transfer in the substrate support in view of the values of parameters.

8. The method of claim 1, wherein the data indicative of the properties of the substrate support comprises a two-dimensional map of at least one of heater electrode depth, surface profile, or steady-state surface temperature.

9. The method of claim 1, further comprising:

receiving, from the one or more sensors of the removable sensor assembly, second data indicative of the properties of the substrate support, wherein the second data was generated in view of measurements generated by the one or more sensors at a different time than measurements associated with the first data indicative of the properties of the substrate support;

determining at least one difference between the first data indicative of the properties of the substrate support and the second data indicative of the properties of the substrate support; and causing performance of a corrective action based on the at least one difference.

10. A method, comprising:

obtaining capacitive displacement sensor data of a substrate support;

determining a depth of one or more electrodes beneath a surface of the substrate support based on the capacitive displacement sensor data;

providing data indicative of the depth of one or more electrodes to a model of the substrate support;

receiving, from the model of the substrate support, predicted performance data of the substrate support based on the provided data;

determining, in view of the predicted performance data, predicted properties of a substrate to be processed using the substrate support;

obtaining measured properties of the substrate processed using the substrate support; and causing performance of a corrective action based on the predicted properties of the substrate, the measured properties of the substrate, and one or more differences between the predicted properties of the substrate and the measured properties of the substrate.

11. The method of claim 10, wherein the corrective action comprises at least one of:

sending an alert to a user;

scheduling preventative maintenance;

scheduling corrective maintenance;

updating a process recipe;

updating a calibration table or an equipment constant; or correcting for chamber drift.

12. The method of claim 10, further comprising:

receiving metrology data of a substrate;

receiving data indicative of a corrective action associated with manufacturing equipment used to produce the substrate; and causing a machine learning model to be trained by providing as training input data indicative of metrology data of the substrate and predicted properties of the substrate, and providing as target output data indicative of the corrective action associated with manufacturing equipment used to produce the substrate.

13. The method of claim 10, further comprising:

providing, as input to a trained machine learning model, the predicted properties of a substrate; and receiving, from the trained machine learning model, data indicative of a corrective action associated with manufacturing equipment.

14. The method of claim 10, wherein the predicted properties of a substrate comprise a two-dimensional map of at least one of thickness, etch rate, or stress of the substrate.

* * * * *